United States Patent
Jang et al.

(10) Patent No.: US 11,460,989 B2
(45) Date of Patent: Oct. 4, 2022

(54) DISPLAY DEVICE AND METHOD FOR CONTROLLING THEREOF

(71) Applicant: SAMSUNG ELECTRONICS CO., LTD., Suwon-si (KR)

(72) Inventors: Sunghyun Jang, Suwon-si (KR); Junsik Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/920,477

(22) Filed: Jul. 3, 2020

(65) Prior Publication Data

US 2021/0208769 A1 Jul. 8, 2021

Related U.S. Application Data

(60) Provisional application No. 62/956,716, filed on Jan. 3, 2020.

(30) Foreign Application Priority Data

Jan. 6, 2020 (KR) ........................ 10-2020-0001416

(51) Int. Cl.
| | |
|---|---|
| *G06F 3/04845* | (2022.01) |
| *G06F 1/16* | (2006.01) |
| *G06F 3/04847* | (2022.01) |

(52) U.S. Cl.
CPC ........ *G06F 3/04845* (2013.01); *G06F 1/1622* (2013.01); *G06F 3/04847* (2013.01);
(Continued)

(58) Field of Classification Search
CPC ............. G06F 3/04847; G06F 3/04845; G06F 1/1622; G06F 2200/1614; G06F 3/04817;
(Continued)

(56) References Cited

U.S. PATENT DOCUMENTS 7,598,948 B1 * 10/2009 Priem ..................... G09G 5/00
345/204
8,300,065 B2 10/2012 Kim et al.
(Continued)

FOREIGN PATENT DOCUMENTS

| EP | 3 444 798 A1 | 2/2019 |
|---|---|---|
| JP | 2005024668 A | 1/2005 |

(Continued)

OTHER PUBLICATIONS

International Search Report (PCT/ISA/210) dated Oct. 6, 2020 by the International Searching Authority in counterpart International Patent Application No. PCT/KR2020/008719.
(Continued)

*Primary Examiner* — Julie Anne Watko
(74) *Attorney, Agent, or Firm* — Sughrue Mion, PLLC

(57) ABSTRACT

A method of controlling a display device outputting an image in either one of display modes including a horizontal mode and a vertical mode, the display device including a display configured to be rotatable, includes displaying at least one user interface (UI) element corresponding to at least one image content. The method further includes based on a user instruction of positioning a highlight on a first UI element among the displayed at least one UI element, identifying whether a resolution of a first image content corresponding to the first UI element corresponds to a current display mode, and based on the resolution of the first image content being identified to not correspond to the current display mode, providing a visual effect to the first UI element.

14 Claims, 15 Drawing Sheets

(52) U.S. Cl.
CPC ............... *G06F 2200/1614* (2013.01); *G06F 2203/04803* (2013.01); *G09G 2340/045* (2013.01); *G09G 2340/0442* (2013.01); *G09G 2340/0492* (2013.01); *G09G 2340/14* (2013.01)

(58) Field of Classification Search
CPC .... G06F 2203/04803; G09G 2340/045; G09G 2340/0492; G09G 2340/14; G09G 2340/0442
See application file for complete search history.

(56) References Cited

U.S. PATENT DOCUMENTS

| | | | |
|---|---|---|---|
| 8,484,681 | B2 | 7/2013 | Koo et al. |
| 9,628,744 | B2 | 4/2017 | Phang et al. |
| 2010/0214319 | A1 | 8/2010 | Nakano |
| 2011/0154406 | A1 | 6/2011 | Koo et al. |
| 2012/0315954 | A1* | 12/2012 | Ahn ............... G06F 1/1694 345/173 |
| 2013/0265217 | A1* | 10/2013 | Sakaguchi ........... G06F 3/0338 345/156 |
| 2014/0189582 | A1 | 7/2014 | Igari |
| 2014/0333671 | A1* | 11/2014 | Phang ................ G06F 3/017 345/659 |
| 2015/0319367 | A1* | 11/2015 | Kaplan ............ H04N 21/47205 348/333.05 |
| 2019/0050964 | A1 | 2/2019 | Jang et al. |

FOREIGN PATENT DOCUMENTS

| | | | |
|---|---|---|---|
| JP | 2010-218544 | A | 9/2010 |
| JP | 2015-95085 | A | 5/2015 |
| JP | 2015095085 | A * | 5/2015 |
| JP | 2018-121297 | A | 8/2018 |
| KR | 100580174 | B1 | 5/2006 |
| KR | 10-2006-0082926 | A | 7/2006 |
| KR | 100654845 | B1 | 12/2006 |
| KR | 100654845 | B1 * | 12/2006 |
| KR | 1020110038559 | A | 4/2011 |
| KR | 1020110075887 | A | 7/2011 |
| KR | 10-1411323 | B1 | 6/2014 |
| KR | 10-2014-0133363 | A | 11/2014 |
| KR | 10-2014-0146488 | A | 12/2014 |
| KR | 10-2016-0088776 | A | 7/2016 |
| KR | 10-1655807 | B1 | 9/2016 |

OTHER PUBLICATIONS

Written Opinion (PCT/ISA/237) dated Oct. 6, 2020 by the International Searching Authority in counterpart International Patent Application No. PCT/KR2020/008719.
Communication dated Aug. 1, 2022, issued by the European Patent Office in counterpart European Application No. 20909855.7.

* cited by examiner

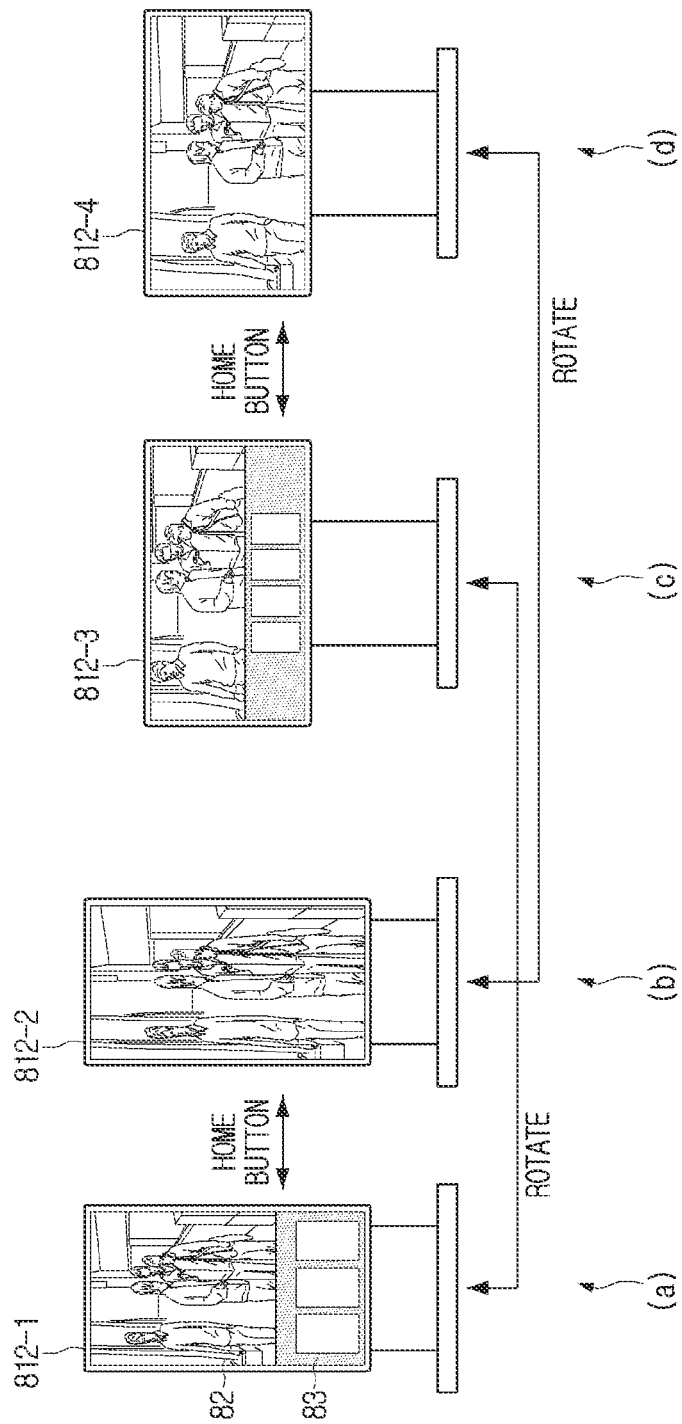

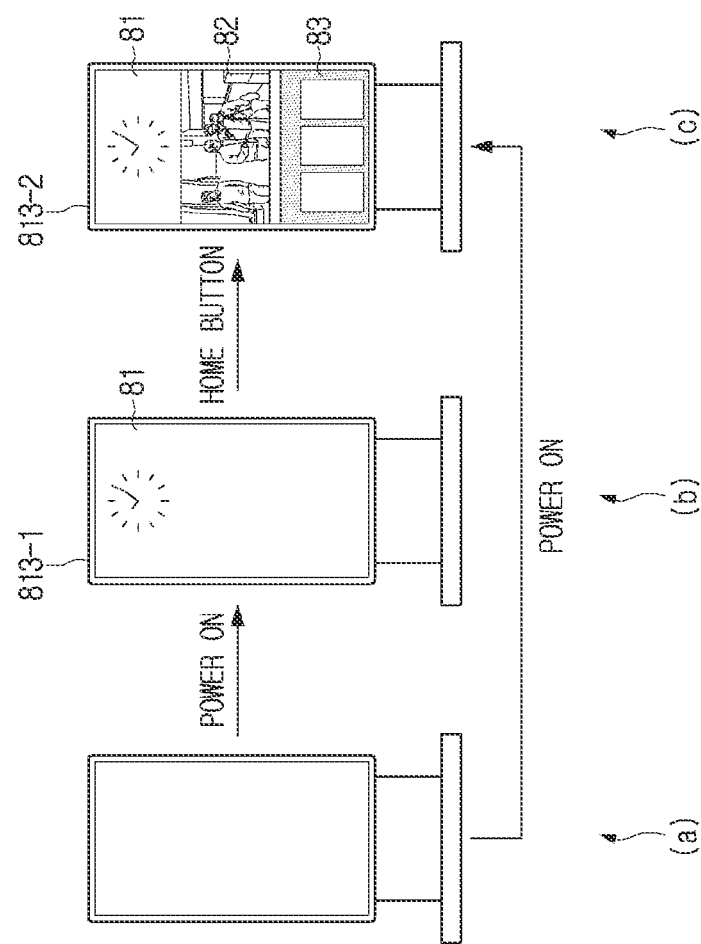

DISPLAY DEVICE AND METHOD FOR CONTROLLING THEREOF

CROSS-REFERENCE TO RELATED APPLICATIONS

This application is based on and claims priority under 35 U.S.C. § 119 to Korean Patent Application No. 10-2020-0001416, filed on Jan. 6, 2020, in the Korean Intellectual Property Office, and based on and claims the benefit of U.S. Provisional Patent Application No. 62/956,716, filed on Jan. 3, 2020, in the U.S. Patent and Trademark Office, the disclosures of which are herein incorporated by reference in their entireties.

BACKGROUND

Field

The disclosure relates to a display device and a method for controlling thereof, and more particularly, to a display device providing a visual effect related to rotation of a display to a user interface (UI) element displayed on the rotatable display and a method for controlling thereof.

Description of Related Art

In recent years, users are spending more time experiencing content through a mobile device such as a smartphone. Therefore, web content including social media may be provided to a user based on an aspect ratio of a mobile device and the user's gripping direction of the mobile device. In addition, image content provided in a horizontal direction was common in the past, but in recent years, an amount of content provided in a vertical direction has been rapidly increased.

However, when viewing content through a mobile device such as a smartphone, a user may have a limited viewing experience due to a restriction on a display size or the like of the mobile device, as compared to when viewing the content through a display device such as a television (TV). In addition, the display device may generally have a display having a shape long in a horizontal direction, and it may thus be generally uncomfortable for the user to view the content on the display of the TV in a vertical direction.

In recent years, there have been more cases in which a display device such as a TV includes a rotatable display, and thus a user may view content in a vertical direction as well as in a horizontal direction. However, for search, there may be a need for a method for providing a guide on rotation of the display and a guide on an operation method related to the rotation of the display such as a stop or a return during its rotation.

SUMMARY

According to an embodiment of the disclosure, there is provided a method of controlling a display device outputting an image in either one of display modes including a horizontal mode and a vertical mode, the display device including a display configured to be rotatable. The method includes displaying at least one user interface (UI) element corresponding to at least one image content, and based on a user instruction of positioning a highlight on a first UI element among the displayed at least one UI element, identifying whether a resolution of a first image content corresponding to the first UI element corresponds to a current display mode. The method further includes, based on the resolution of the first image content being identified to not correspond to the current display mode, providing a visual effect to the first UI element.

The providing of the visual effect may include, based on the resolution of the first image content being identified to not correspond to the current display mode, rotating the first UI element in a predetermined direction in a predetermined range.

The predetermined range may correspond to a rotation range of the display, and the predetermined direction may be the same as a rotation direction of the display.

The providing of the visual effect may include displaying the first UI element at a size that is changed to have the same aspect ratio as the first image content.

The providing of the visual effect may include, based on the resolution of the first image content being identified to not correspond to the current display mode, displaying a text guiding a rotation direction of the display, around the first UI element, while the current display mode is switched to a different mode.

The providing of the visual effect may include, based on the resolution of the first image content being identified to correspond to the current display mode, providing the visual effect to the first UI element so that the first UI element is distinguished from another UI element among the at least one UI element, while the first UI element is paused.

The method may further include, based on a user instruction of selecting the first UI element among the displayed at least one UI element, displaying a guide message on rotation of the display, while rotating the display in a predetermined direction, and moving pixel coordinates of the displayed guide message, based on a rotation angle of the display, so that a horizontality of the guide message is maintained with an installation surface of the display device during the rotation of the display.

The guide message may include information of a rotation direction of the display and of cancellation of the rotation of the display based on switching of the current display mode of the display device.

The method may further include, based on a user instruction of canceling the rotation of the display during the rotation of the display, rotating the display in a direction opposite to the predetermined direction so that the display returns to a position before the rotation of the display.

Accordingly to embodiments, there is provided, a display device for outputting an image in either one of display modes including a horizontal mode and a vertical mode. The display device includes a display configured to be rotatable, and a processor configured to control the display to display at least one user interface (UI) element corresponding to at least one image content. The processor is further configured to, based on a user instruction of positioning a highlight on a first UI element among the displayed at least one UI element, identify whether a resolution of a first image content corresponding to the first UI element corresponds to a current display mode, and based on the resolution of the first image content being identified to not correspond to the current display mode, control the display to provide a visual effect to the first UI element.

The processor may be further configured to, based on the resolution of the first image content being identified to not correspond to the current display mode, control the display to rotate the first UI element in a predetermined direction in a predetermined range.

The predetermined range may correspond to a rotation range of the display, and the predetermined direction may be the same as a rotation direction of the display.

The processor may be further configured to control the display to display the first UI element at a size that is changed to have the same aspect ratio as the first image content.

The processor may be further configured to, based on the resolution of the first image content being identified to not correspond to the current display mode, control the display to display a text guiding a rotation direction of the display, around the first UI element, while the current display mode is switched to a different mode.

The processor may be further configured to, based on the resolution of the first image content being identified to correspond to the current display mode, control the display to provide the visual effect to the first UI element so that the first UI element is distinguished from another UI element among the at least one UI element, while the first UI element is paused.

The processor may be further configured to, based on a user instruction of selecting the first UI element among the displayed at least one UI element, control the display to display a guide message on rotation of the display, while controlling to rotate the display in a predetermined direction, and control the display to move pixel coordinates of the displayed guide message, based on a rotation angle of the display, so that a horizontality of the guide message is maintained with an installation surface of the display device during the rotation of the display.

The guide message may include information of a rotation direction of the display and of cancellation of the rotation of the display based on switching of the current display mode of the display device.

The processor may be further configured to, based on a user instruction of canceling the rotation of the display during the rotation of the display, control the display to rotate the display in a direction opposite to the predetermined direction so that the display returns to a position before the rotation of the display.

Accordingly to embodiments, there is provided a method of controlling a display device outputting an image in either one of display modes including a horizontal mode and a vertical mode, the display device including a display configured to be rotatable. The method includes displaying an image content, and based on a user instruction of rotating the display while the image content is displayed, controlling to rotate the display, and changing the image content, based on a rotation angle of the display. The method further includes, based on a user instruction of calling a selection window during rotation of the display and while the changed image content is displayed, ceasing the rotation of the display, and displaying the selection window, while the changed image content is displayed, and based on a user selection of an item for adjusting a horizontality of the image content, among the displayed selection window, adjusting the horizontality of the image, based on the rotation angle of the display.

The method may further include, based on the user instruction of calling the selection window while the image content is displayed, displaying the selection window, while the image content is displayed, the selection window including a guide message for guiding setting of the rotation angle of the display. Additional aspects will be set forth in part in the description that follows and, in part, will be apparent from the description, or may be learned by practice of the presented embodiments.

BRIEF DESCRIPTION OF THE DRAWINGS

The above and other aspects, features, and advantages of embodiments of the disclosure will be more apparent from the following description taken in conjunction with the accompanying drawings, in which:

FIG. 8C is a view for describing a display layout of a display device, according to yet another embodiment of the disclosure;

FIG. 8D is a view for describing a display layout of a display device, according to still another embodiment of the disclosure;

DETAILED DESCRIPTION

Figure 1:
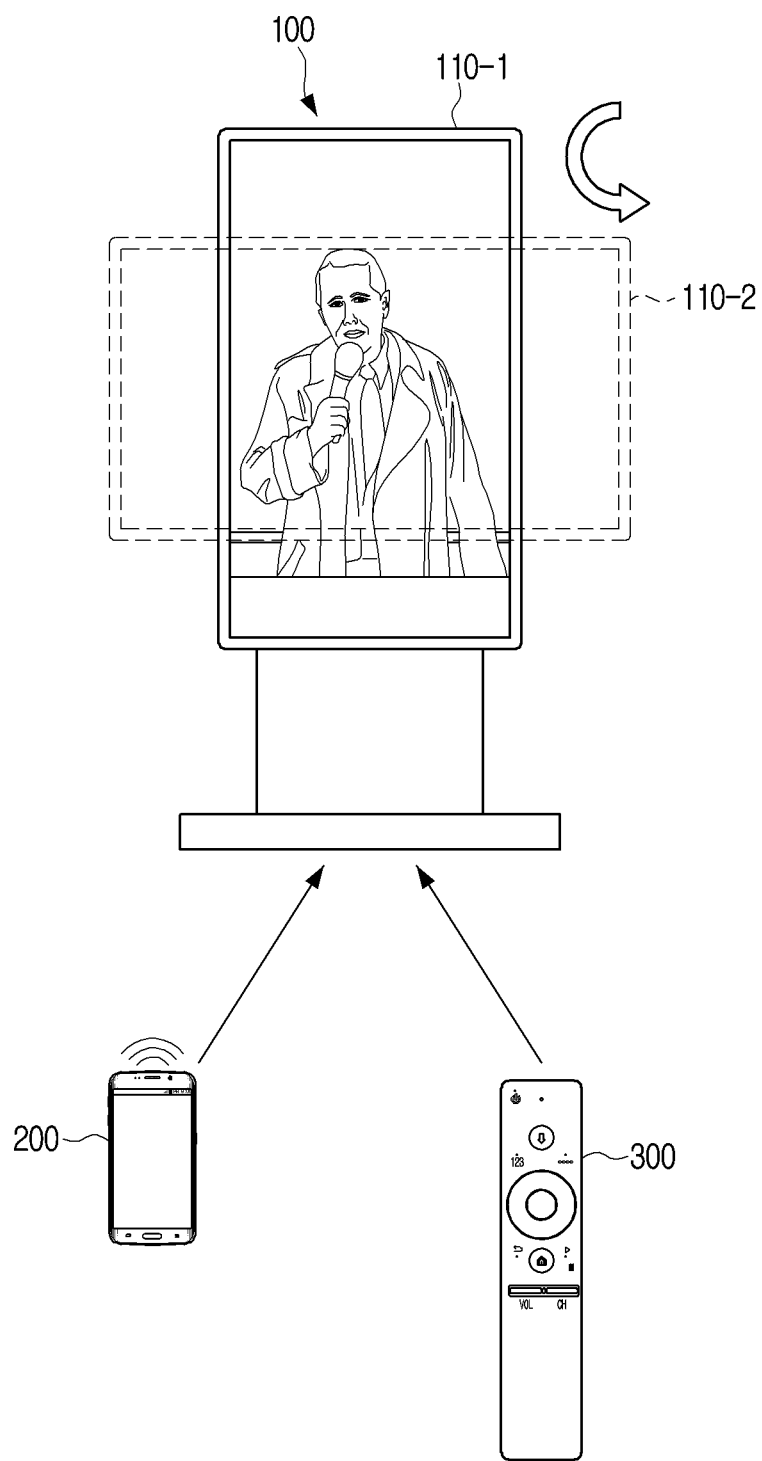
FIG. 1 is a view for schematically describing a control process of a display device, according to an embodiment of the disclosure.

The disclosure provides a guide on rotation of a display for a user to more easily operate a display device. According to embodiments of the disclosure as described above, the user convenience and satisfaction may be improved because the user may receive the guide on the rotation of the display from the display device, and thus easily operate the display device.

The specification briefly describes terms used herein first and then focuses on the disclosure in detail.

General terms that are currently widely used are selected as terms used in embodiments of the disclosure in consideration of functions in the disclosure, but may be changed depending on the intention of those skilled in the art or a judicial precedent, the emergence of a new technique and the like. In addition, terms arbitrarily chosen by an applicant may exist. In this case, the meanings of such terms are mentioned in detail in corresponding description portions of the disclosure. Therefore, the terms used in the embodiments of the disclosure may be defined on the basis of the meanings of the terms and the contents throughout the disclosure rather than simple names of the terms.

The disclosure may be variously modified and have several embodiments, and thus embodiments of the disclosure are shown in the drawings and be described in detail in the detailed description. However, it is to be understood that the disclosure is not limited to specific embodiments, but includes all modifications, equivalents and substitutions without departing from the scope and spirit of the disclosure. If it is decided that a detailed description for the known art related to the disclosure may obscure the gist of the disclosure, the detailed description is omitted.

Terms 'first', 'second' and the like, may be used to describe various components, but the components are not to be construed as being limited by the terms. The terms are used only to distinguish one component from another component.

Singular forms used herein are intended to include plural forms unless explicitly indicated otherwise. It is to be understood that terms 'comprise' or 'include' used in the specification, specify the presence of features, numerals, steps, operations, components, parts mentioned in the present specification or combinations thereof, but do not preclude the presence or addition of one or more other features, numerals, steps, operations, components, parts or combinations thereof.

Hereinafter, embodiments of the disclosure are described in detail with reference to the accompanying drawings so that those skilled in the art to which the disclosure pertains may easily practice the disclosure. However, the disclosure may be implemented in various different forms and is not limited to the embodiments described herein. In addition, in the drawings, portions unrelated to the description are omitted to obviously describe the disclosure, and similar portions are denoted by similar reference numerals throughout the specification.

FIG. 1 is a view for schematically describing a control process of a display device, according to an embodiment of the disclosure.

As shown in FIG. 1, a display device 100 according to an embodiment of the disclosure may rotate a display of the display device 100. That is, the display device 100 according to the disclosure may perform an allegedly pivot function. In detail, the display may be rotated to be positioned in a horizontal or vertical direction. FIG. 1 shows a state 110-1 in which the display is positioned in the vertical direction, and shows a state 110-2 in which the display is positioned in the horizontal direction with a dotted line. FIG. 1 shows that the display is rotated in a counter-clockwise direction, but the display may be rotated in a clockwise direction.

Hereinafter, the description of the disclosure may describe that the display is rotated in the horizontal or vertical direction in case that the display is pivoted to be positioned in the horizontal or vertical direction. In addition, the description may describe that: the display device 100 is operated in a horizontal mode in case that the display is positioned in the horizontal direction; and the display device 100 is operated in a vertical mode in case that the display is positioned in the vertical direction. As such, the display device 100 may output an image in either one of display modes including the horizontal or vertical mode. However, the display device 100 may not only output the image in the horizontal or vertical mode, but may also output the image in a state in which the display device 100 is inclined at an angle based on a user instruction (for example, a state in which the display device 100 is inclined in a diagonal direction). The display device 100 may be implemented as, for example, a digital television (TV) or a monitor, but its type is not particularly limited.

According to an embodiment of the disclosure, the display device 100 may receive a user instruction to control the display device 100. In detail, the display device 100 may receive the user instruction through a user terminal 200 in communication with the display device 100, and may receive the user instruction through a remote control device 300 for controlling the display device 100.

Here, the user terminal 200 may communicate with the display device 100 and transmit a control signal and an image content to the display device 100. The user terminal 200 may communicate with the display device 100 through a communication method such as wi-fi, bluetooth and the like, and its communication method is not particularly limited. The user terminal 200 may be implemented as, for example, a smartphone, a tablet PC or the like, and its type may not be particularly limited.

The remote control device 300 may receive a user input for controlling the display device 100, and output the control signal for controlling the display device 100 based on the received user input. The remote control device 300 may output the control signal through a communication method such as infrared communication, radio frequency (RF) communication, bluetooth or ultra-wideband (UWB) communication. The communication method of the remote control device 300 is not particularly limited, either. The remote control device 300 may be, for example, a remote controller, but is not limited thereto, and may be implemented as a smartphone or the like.

The display device 100 may provide a user with various guide information on rotation of a display 110. The description hereinafter focuses on embodiments of the display device 100 providing the guide information on the rotation of the display 110.

Figure 2A:
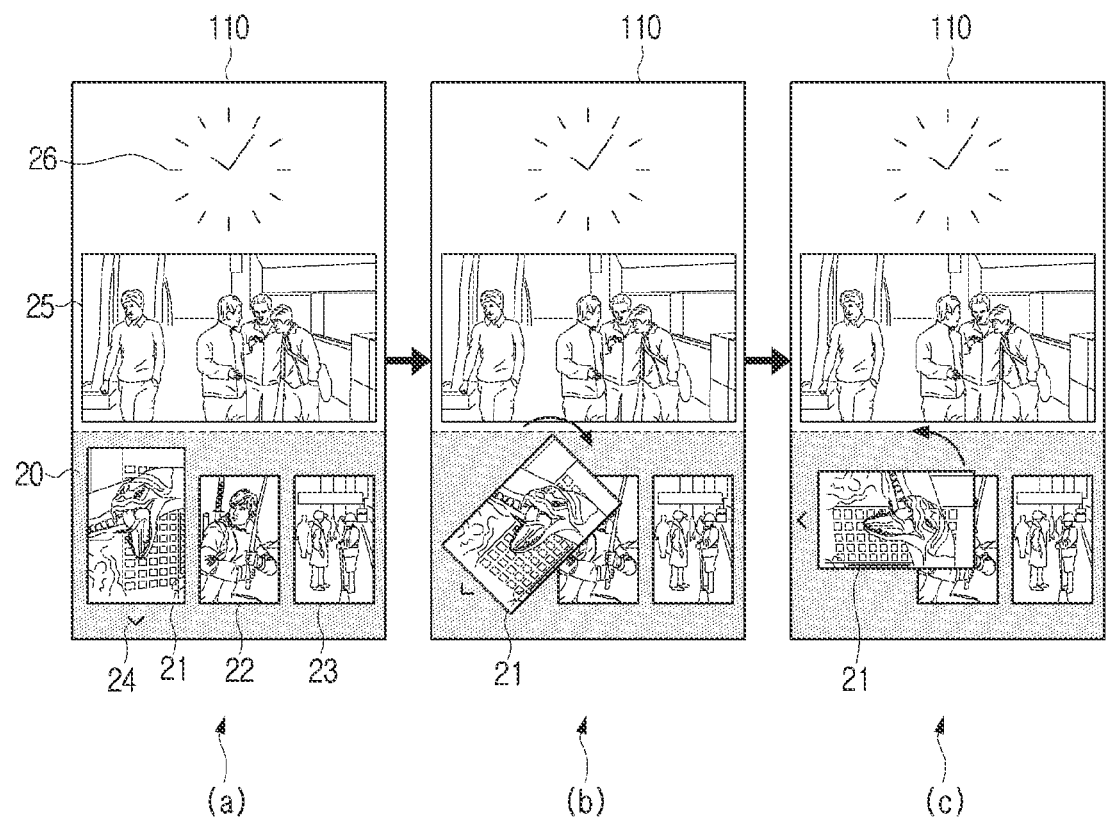
FIG. 2A is a view showing a display device providing guide information, according to an embodiment of the disclosure.

FIG. 2A is a view showing a display device providing guide information, according to an embodiment of the disclosure.

As shown in portions (a)-(c) of FIG. 2A, the display device 100 may display at least one user interface (UI) element corresponding to at least one image content in a region of the display 110. Here, the UI element may refer to a text representing a title of the image content, an icon, summarized information on the image content or a thumbnail image. The display device 100 may display a plurality of UI elements on a content browser 20 provided in a region of the display 110. For example, the display device 100 may display: a first UI element 21 corresponding to a first image content; a second UI element 22 corresponding to a second image content; and a third UI element 23 corresponding to a third image content. The display 110 of the display device 100 shown in portions (a)-(c) of FIG. 2A may display the UI element in the vertical mode. In addition, the display device 100 may display a screen 25 in a region of the display 110. Here, the display device 100 may display various contents on the screen 25. For example, the content may include an image content, a music content, an e-book content, a photo content and a game content, but is not limited thereto. In addition, the display device 100 may display a vertical-mode content 26 on the display 110. Here, the vertical-mode content 26 may refer to a content provided only in case that the display device 100 is in the vertical mode. For example, the vertical-mode content 26 may include various applications such as a watch, a picture, a photo, etc.

The display device 100 may provide a visual effect to the first UI element 21 for the first UI element 21 and the second UI element 22 to be distinguished from each other in case that a highlight (or focus) is positioned on the first UI element 21 based on the user instruction. For example, the display device 100 may display the first UI element 21 at an enlarged size to be highlighted. Further, the display device 100 may display an indicator 24 indicating a position of the highlight around the first UI element 21.

In addition, in case that the highlight is positioned on the first UI element 21 based on the user instruction, the display device 100 may identify whether a resolution of the first image content corresponding to the first UI element 21 corresponds to a current display mode. In detail, in case that the current display mode of the display device 100 is the vertical mode, the display device 100 may identify whether the first image content has a resolution corresponding to the vertical mode. For example, in case that the first image content has a resolution of 9:16, the display device 100 may identify that the first image content has the resolution corresponding to the vertical mode that is the current display mode. Here, the display device 100 may identify that the current display mode is suitable for outputting the first image content. To the contrary, in case that the first image content has a resolution of 16:9, the display device 100 may identify that the first image content has a resolution not corresponding to the vertical mode that is the current display mode but corresponding to the horizontal mode. Here, the display device 100 may identify that the current display mode is not suitable for outputting the first image content. As described above, the display device 100 may identify whether the current display mode is suitable for outputting the first image content based on the current display mode and the resolution of the first image content.

The display device 100 may provide the visual effect to the first UI element 21 based on whether the current display mode corresponds to the resolution of the first image content.

In detail, as shown in portions (b) and (c) of FIG. 2A, the display device 100 may provide the visual effect of rotating the first UI element 21 in a predetermined direction in a predetermined range in case that the resolution of the first image content does not correspond to the current display mode. Here, the predetermined range may correspond to a rotation range of the display device 100, and the predetermined direction may be the same as a rotation direction of the display device 100. For example, the display device 100 in the vertical mode may provide the visual effect of rotating the first UI element 21 clockwise by 90 degrees and then counterclockwise by 90 degrees to return to its original position in case that the resolution of the first image content corresponds to the horizontal mode. Accordingly, the user may recognize that the first image content is not suitable for the current display mode. In addition, the user may recognize that the display mode of the display device 100 needs to be switched to play the first image content. Therefore, the user convenience and satisfaction may be improved.

The display device 100 may provide the visual effect to the first UI element 21 for the first UI element 21 to be distinguished from the second UI element 22 and the third UI element 23 while the first UI element 21 is not rotated but paused in case that the resolution of the first image content corresponds to the current display mode. For example, the display device 100 may output a message, around the first UI element 21, indicating that the first image content may be played in the current display mode.

The display device 100 may provide the visual effect to the first UI element 21 using color based on whether the current display mode corresponds to the resolution of the first image content. For example, if the resolution of the first image content corresponds to the current display mode, the display device 100 may display a border of the first UI element 21 in a first color (e.g., green). If the resolution of the first image content does not correspond to the current display mode, the display device 100 may display the border of the first UI element 21 in a second color (e.g., red) different from the first color. Then, the display device 100 may provide the visual effect of rotating the first UI element 21 as described above in a state in which the border of the first UI element 21 is displayed in the second color.

The display device 100 may display a user interface (UI) element to reflect a screen state (or resolution) of the image content. For example, in case that a horizontal size of the first image content is larger than the vertical size (e.g., 16:9), the display device 100 may display a thumbnail image having a shape in which its horizontal length is longer than its vertical length and corresponding to the first image content. In addition, the display device 100 may display the first UI element 21 at a size changed to have the same aspect ratio as the first image content. Hereinafter, the display device 100 is described in more detail with reference to FIG. 2B.

Figure 2B:
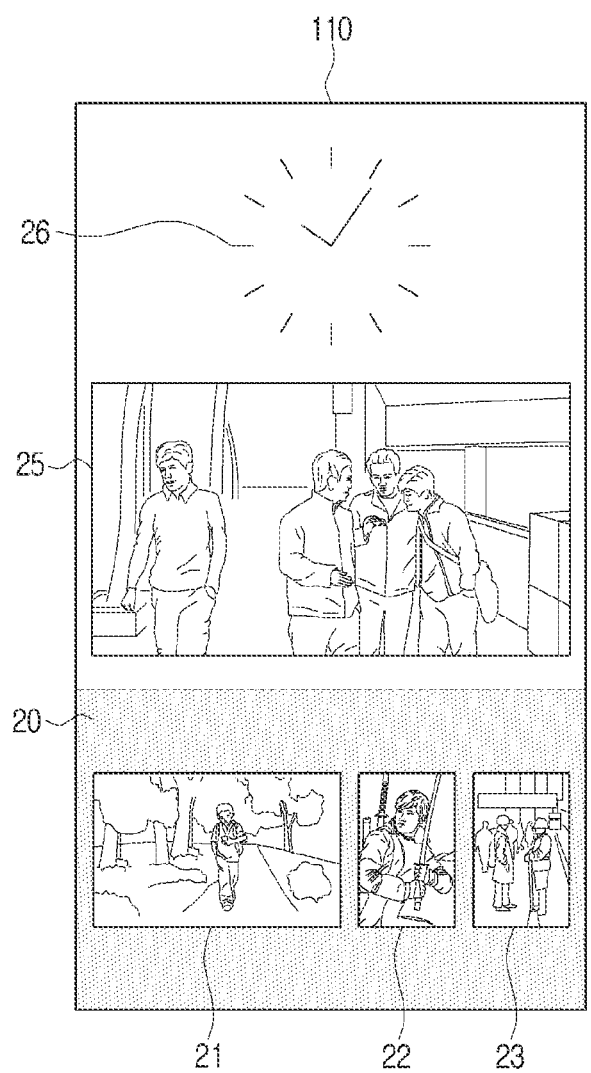
FIG. 2B is a view showing a display according to an embodiment of the disclosure.

FIG. 2B is a view showing a display according to an embodiment of the disclosure.

Referring to FIG. 2B, the display device 100 may display the first user interface (UI) element 21, the second UI element 22 and the third UI element 23. Here, the first UI element 21 may be a thumbnail image for the first image content. In addition, the second UI element 22 may be a thumbnail image for the second image content. In addition, the third UI element 23 may be a thumbnail image for the third image content.

The first image content corresponding to the first UI element 21 may have a resolution (e.g., 16:9) in which its horizontal size is greater than its vertical size. Accordingly, the display device 100 may display the first UI element 21 having a shape in which the resolution of the first image content is reflected. That is, the display device 100 may display the thumbnail image in which its horizontal length is longer than its vertical length. To the contrary, the second image content corresponding to the second UI element 22 may have a resolution (e.g., 9:16) in which its vertical size is greater than its horizontal size. Accordingly, the display device 100 may display the second UI element 22 having a shape in which the resolution of the second image content is reflected. That is, the display device 100 may display the thumbnail image in which its vertical length is longer than its horizontal length. As such, the display device 100 may display the UI element having the shape in which the resolution of the image content is reflected, and thereby the user may predict the resolution of the image content by the UI element.

The display device 100 may display information on a direction of the display 110 that needs to be positioned for the image content to be played. In detail, the display device 100 may display the information on the direction of the display 110 by displaying the UI element to have a shape corresponding to the direction in which the display 110 needs to be positioned for playing the image content. For example, the display 110 may needs to be positioned in the horizontal direction to play the first image content corresponding to the first UI element 21. Here, the display device 100 may display the first UI element 21 to have a shape in which its horizontal length is longer than its vertical length. That is, the display device 100 may display the UI element to have a shape corresponding to the direction in which the display 110 needs to be positioned for playing the image content.

Here, the display device 100 may display the first UI element 21 to correspond to the direction in which the display 110 needs to be positioned in response to a user instruction to call the content browser 20. Alternatively, if the highlight is positioned on the first UI element 21 based on a user instruction after the content browser 20 is called, the display device 100 may display the first UI element 21 at a size changed to have the shape corresponding to the direction in which the display 110 needs to be positioned.

As such, the display device 100 may display the UI element to correspond to the direction in which the display 110 needs to be positioned, and thereby the user may recognize the direction in which the display needs to be positioned for playing the image content corresponding to the UI element. For example, the user may recognize that the first image content corresponding to the first UI element 21 may be played in case that the display 110 is in the horizontal direction. Therefore, the user convenience and satisfaction may be improved.

The display device 100 may display information on the resolution of the first image content in case that the highlight is positioned on the first UI element 21. For example, the display device 100 may display a text, around the first UI element 21, indicating the resolution of the first image content.

The display device 100 may display information on a rotation direction of the display 110 for outputting the first image content in case that the resolution of the first image content does not correspond to the current display mode. For example, as described above, the display device 100 may display the information on the rotation direction of the display 110 through the visual effect of rotating the first UI element 21. In addition, the display device 100 may display the text, around the first UI element 21, guiding the rotation direction of the display 110 for outputting of the first image content. For example, in case that the display device 100 in the vertical mode needs to be rotated in the horizontal direction to output the first image content, the display device 100 may display a text such as "playable after being rotated horizontally" around the first UI element 21.

For convenience of explanation, FIGS. 2A and 2B show a state in which the display 110 is in its vertical position, that is, the display device 100 is in the vertical mode. However, the above-described visual effect may be provided even in a state in which the display 110 is in the horizontal mode.

Figure 3:
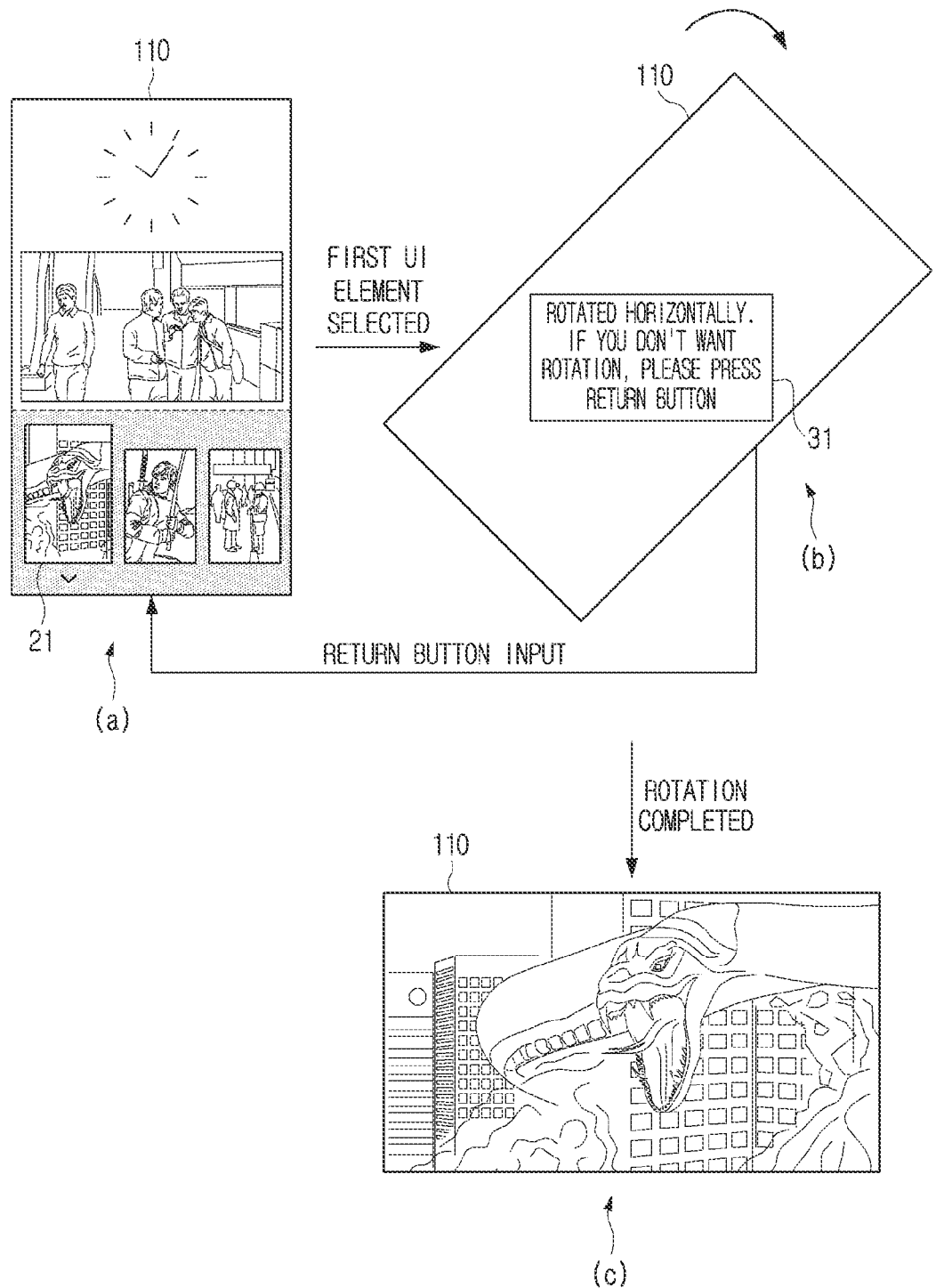
FIG. 3 is a view showing a method of providing a guide message, according to an embodiment of the disclosure.

FIG. 3 is a view showing a method of providing a guide message, according to an embodiment of the disclosure.

As shown in portions (a)-(c) of FIG. 3, in case of obtaining a user instruction to select a UI element corresponding to the image content, the display device 100 may rotate the display 110 to be switched to have a display mode suitable for outputting the image content. In addition, the display device 100 may display a guide message 31 on the rotation of the display 110. For example, in case of obtaining a user instruction to select the first UI element 21 corresponding to the first image content having a resolution corresponding to the horizontal mode, the display device 100 in the vertical mode may display a guide message 31 on the rotation of the display 110 while rotating the display 110 in the horizontal direction. Here, the guide message 31 may include a message such as "Rotated horizontally. If you don't want the rotation, please press the return button." In case of obtaining the user instruction to select the UI element, the display device 100 may remove the content browser displaying the UI elements and the vertical-mode content from the display 110 and display the guide message 31.

In case that the guide message 31 is displayed in a fixed posture on the display 110, the guide message 31 may be rotated based on the rotation of the display 110, thereby making it difficult for the user to recognize the guide message 31. Accordingly, the display device 100 may allow the guide message 31 to be displayed while maintaining its horizontality with an installation surface of the display device 100 during the rotation of the display 110. For example, the display device 100 may move pixel coordinates of the guide message 31 based on a rotation angle of the display 110. Alternatively, the display device 100 may rotate and display the guide message 31 in a direction opposite to the rotation direction of the display 110. Accordingly, even though the display 110 is rotated, the guide message 31 may be displayed while maintaining its horizontality with the installation surface of the display device 100. Therefore, the user convenience and satisfaction may be improved.

The display device 100 may rotate the display 110 after elapse of a predetermined time period from the time at which the guide message 31 is output. Alternatively, the display device 100 may output the guide message 31 while rotating the display 110.

As such, the display device 100 may provide the user with information on the rotation of the display 110 before and after the UI element is selected. Therefore, the user convenience and satisfaction may be improved.

In case of obtaining a user instruction (for example, to input the return button) to cancel the rotation of the display 110 during the rotation of the display 110, the display device 100 may rotate the display 110 back to its original position (i.e., its position in the vertical direction). To the contrary, in case that the display device 100 does not obtain the user instruction to cancel the rotation of the display 110 until the rotation of the display 110 is completed, the display device 100 may complete the rotation of the display 110 and output the first image content.

For convenience of explanation, FIG. 3 shows that the first UI element 21 is selected and the guide message 31 is provided in a state in which the display 110 is in its vertical position. However, the first UI element 21 may be selected and the guide message 31 may be provided in a state in which the display 110 is in its horizontal position.

The display device 100 may output the image content in a diagonal mode rather than the horizontal or vertical mode.

Figure 4:
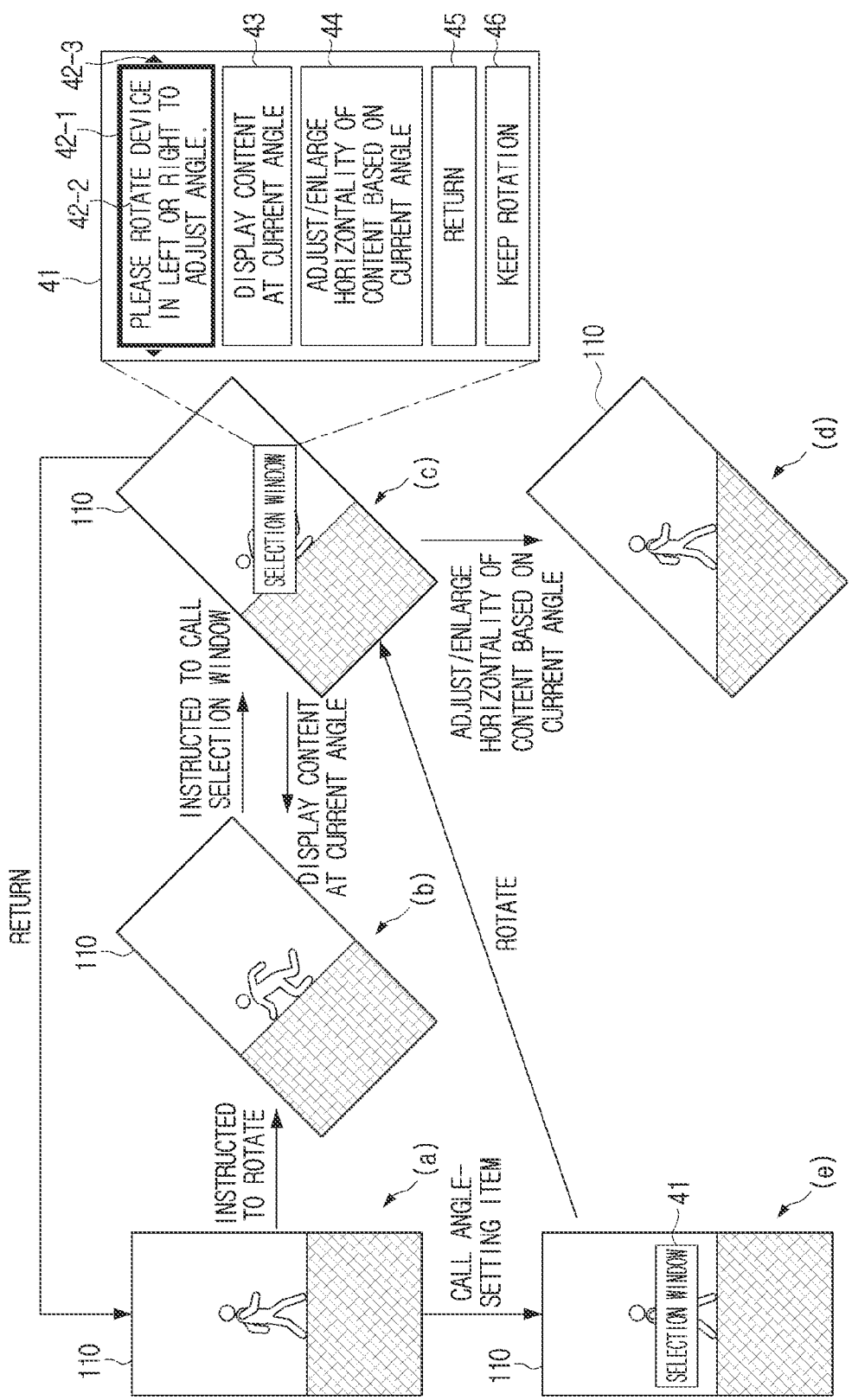
FIG. 4 is a view for describing an operation of a display device, according to an embodiment of the disclosure.

FIG. 4 is a view for describing an operation of a display device, according to an embodiment of the disclosure.

Referring to portion (a) of FIG. 4, the display device 100 may display an image content on the display 110. In addition, referring to portion (b) of FIG. 4, the display device 100 may rotate the display 110 in response to a user instruction to rotate the display 110. For example, the display device 100 may rotate the display 110 in response to a user instruction to input a rotation button. The image content may be changed in response to the rotation of the display 110. In detail, the image content may be output based on the rotation angle of the display 110. For example, a person walking on a flat surface may be displayed before the display 110 is rotated, and then the person climbing a slope may be displayed as the display 110 is rotated. Alternatively, in case of obtaining the user instruction to rotate the display 110, the display device 100 may stop playing the image content being played.

Referring to portions (c) of FIG. 4, in case of obtaining a user instruction to call a selection window 41 during the rotation of the display 110, the display device 100 may stop the rotation of the display 110 and display the selection window 41. Here, the user instruction to call the selection window may be made in various ways. For example, the user instruction to call the selection window may be made based on the user instruction to input the rotation button during the rotation of the display 110. That is, the display device 100 may rotate the display 110 in response to the user instruction to input the rotation button, and may stop the rotation of the display 110 and display the selection window 41 in response to the user instruction to input the rotation button again during the rotation of the display 110. Alternatively, the display device 100 may display the selection window 41 in response to a user instruction to input a selection-window call button provided separately from the rotation button of the display 110.

The selection window 41 may include various items related to the rotation of the display 110. In detail, the selection window 41 according to an embodiment may include a first item 42-1 for controlling an angle of the display 110. The first item 42-1 may be an item for adjusting the rotation angle of the display 110. In case that the highlight is positioned in the first item 42-1 based on a user instruction, the display device 100 may display a guide message 42-2 for guiding setting of the rotation angle of the display 110 and an angle setting button 42-3. For example, the display device 100 may display the guide message 42-2 such as "Please rotate the device in left or right to adjust the angle." Then, the display device 100 may rotate the display 110 based on the rotation angle of the display 110 set by the user.

In addition, the selection window 41 may include a second item 43 for playing the image content at a current angle of the display 110. For example, the second item 43 may be displayed as a guide message such as "Display the content at the current angle." In case of obtaining a user instruction to select the second item 43, the display device 100 may close the selection window 41 and display the image content at the current angle of the display 110. That is, in case that the rotation is stopped based on the user instruction to call the selection window 41, the display device 100 may display the image content at the current angle of the display 110.

In addition, the selection window 41 may include a third item 44 for adjusting horizontality of the image content based on the current angle of the display 110. In detail, referring to portion (d) of FIG. 4, in case of obtaining a user instruction to select the third item 44, the display device 100 may display a horizontally-adjusted image content based on the current angle of the display 110. For example, in case of obtaining the user instruction to select the third item 44, the display device 100 may move a pixel position of the image content based on information on the rotation angle of the display 110 for the image content to be displayed while maintaining its horizontality with the installation surface of the display device 100. In case of obtaining the user instruction to select the third item 44, the display device 100 may adjust the horizontality of the image content and enlarge the image content to have a size corresponding to a size of the display 110. In addition, the third item 44 may be displayed as a guide message such as "Adjust/enlarge horizontality of the content based on the current angle."

In addition, the selection window 41 may include a fourth item 45 for returning the display 110 to its original position before the rotation. In detail, in case of obtaining a user instruction to select the fourth item 45, the display device 100 may rotate the display 110 rotated in a first direction based on the user instruction to rotate the display 110 in a second direction opposite to the first direction. Accordingly, the display 110 may return to its original position before the rotation. In addition, the fourth item 45 may be displayed as a guide message such as "Return."

The selection window 41 may include a fifth item 46 for keeping the rotation of the display 110. In detail, in case of obtaining a user instruction to select the fifth item 46, the display device 100 may rotate the display 110 that stopped its rotation again based on the user instruction to call the selection window 41. In addition, the fifth item 46 may be displayed as a guide message such as "Keep rotation."

Referring to portion (e) of FIG. 4, the display device 100 may display the selection window 41 before the display 110 is rotated. For example, the display device 100 may display the selection window 41 based on a user instruction to press and hold the rotation button. Alternatively, the display device 100 may display the selection window 41 based on the user instruction to call the selection window 41.

Accordingly, the display device 100 may guide the user to set a to-be-rotated angle of the display 110 before the display 110 is rotated. In case that the selection window 41 is displayed before the display 110 is rotated, some of the items included in the selection window 41 may be deactivated. For example, any one or any combination of the third item 44, the fourth item 45 and the fifth item 46 may be deactivated.

As such, the display device 100 may output the image content even in case that the display 110 is positioned in the diagonal direction as well as in the horizontal or vertical direction. Accordingly, a user need for various contents may be satisfied, thereby improving the user satisfaction. For convenience of explanation, FIG. 4 shows that the selection window 41 is displayed in a state in which the display 110 is rotated from its vertical position. However, the selection window 41 may be displayed in a state in which the display 110 is rotated from its horizontal position.

The angle of the display 110 may be rotated from a predetermined posture due to external impact or the user's physical contact. Here, if the display device 100 does not guide the user that the angle of the display 110 is rotated and changed, the user may feel uncomfortable. Accordingly, in case of detecting a change in the angle of the display 110 in a state in which the user instruction to rotate the display 110 is not input, the display device 100 may provide the user with information on the change in the angle of the display 110. Hereinafter, the description focuses on a method for controlling the display device 100 in case that the change in the angle of the display 110 occurs in a state in which the user instruction to rotate the display 110 is not input.

Figure 5:
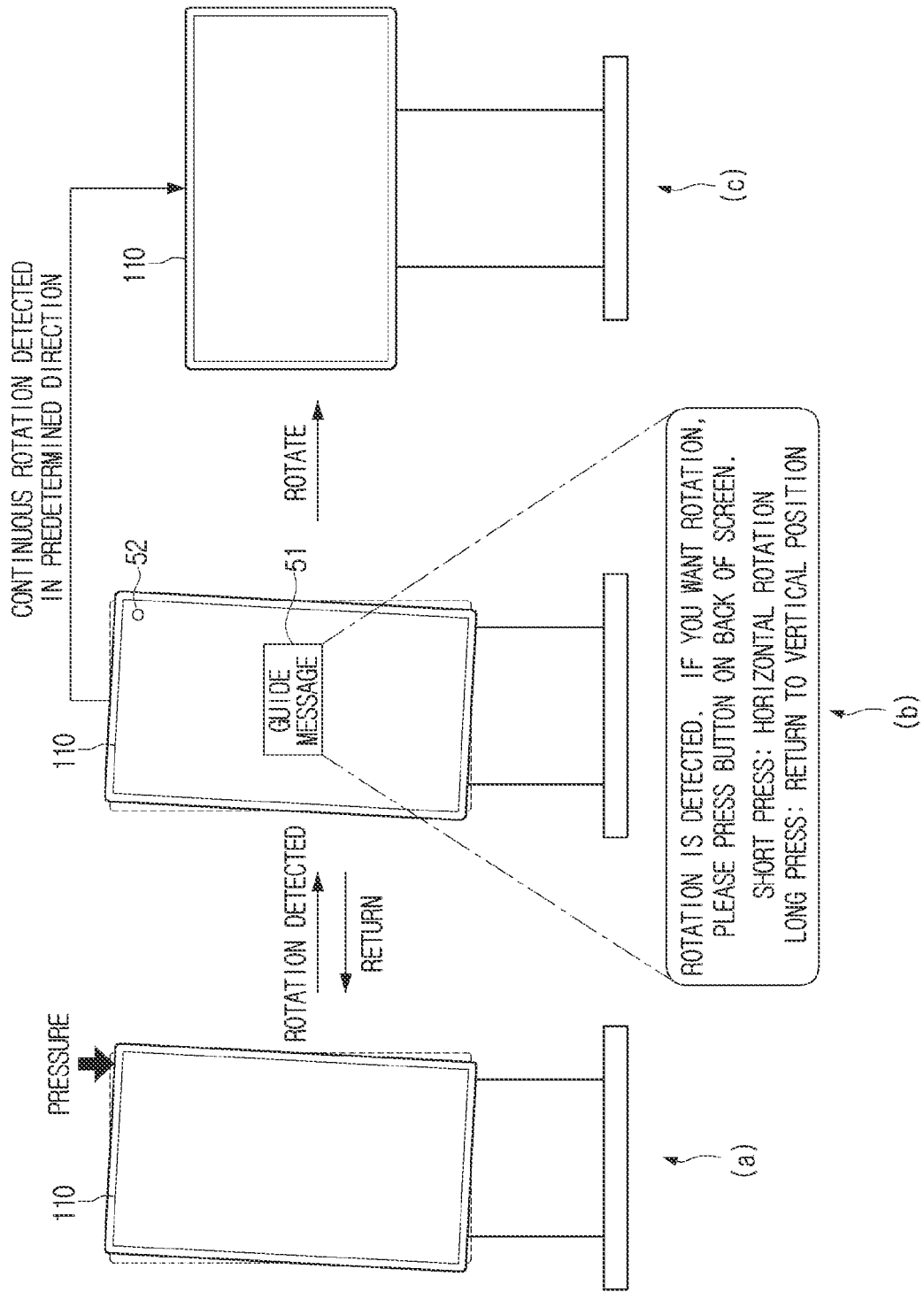
FIG. 5 is a view for describing a method for controlling a display device, according to an embodiment of the disclosure.

FIG. 5 is a view for describing a method for controlling a display device, according to an embodiment of the disclosure.

As shown in portions (a)-(c) of FIG. 5, the angle of the display 110 may be changed from a predetermined posture by its rotation due to external pressure. For example, the display 110 positioned in the vertical direction may be rotated by a predetermined angle in the clockwise direction due to the external pressure. Here, the display device 100 may obtain the information on the rotation of the display 110. For example, the display device 100 may obtain the rotation direction and rotation angle of the display 110. In addition, the display device 100 may identify whether the detected rotation of the display 110 is due to the external pressure rather than the user instruction. In detail, the display device 100 may identify that the rotation of the display 110 detected in a state in which the display device 100 does not obtain the user instruction to rotate the display 110 is due to the external pressure.

Referring to portion (b) of FIG. 5, in case of detecting the rotation of the display 110 due to the external pressure, the display device 100 may output a guide message 51 for guiding the rotation of the display 110. In addition, the display device 100 may display a guide display 52 for guiding a position of a control button controlling the rotation of the display 110. In addition, the display device 100 may output a sound signal informing the rotation of the display 110. For example, as shown in portion (b) of FIG. 5, the display device 100 may output the guide message 51 such as "Rotation is detected. If you want the rotation, please press button on the back." In addition, the guide message 51 may include a text guiding how to operate the control button. For example, the guide message 51 may include the text such as "short press: horizontal rotation, long press: return to vertical position." In case of detecting the rotation of the display 110 while the display 110 is in a power-off state, the display device 100 may display the guide message 51 and the guide display 52 in case that the display 110 is switched to be in a power-on state based on a user instruction.

Referring to portion (a) or (c) of FIG. 5, the display device 100 may rotate the display 110 in the detected rotation direction or return the display 110 to its position before the rotation, based on a user instruction to input the control button. In detail, referring to portion (c) of FIG. 5, in case of obtaining the user instruction to rotate the display 110 in the detected rotation direction, the display device 100 may rotate the display 110 in the detected rotation direction. For example, in case that the display 110 is rotated clockwise due to the external pressure, if the display device 100 obtains the user instruction to press the control button for a time less than a predetermined time, the display device 100 may rotate the display 110 clockwise until the display 110 is positioned in the horizontal direction. In addition, referring to portion (a) of FIG. 5, in case of obtaining a user instruction to return the display 110 to its position before the rotation is detected, the display device 100 may rotate the display 110 to return the display 110 to its position before the rotation. For example, in case that the display 110 is rotated clockwise due to the external pressure, if the display device 100 obtains the user instruction to press the control button for a time more than the predetermined time, the display device 100 may rotate the display 110 counterclockwise until the display 110 is positioned in the vertical direction.

The display device 100 may control the rotation of the display 110 based on a detected rotation time of the display 110. For example, in case that the detected rotation time of the display 110 is more than a predetermined time, the display device 100 may rotate the display 110 in the detected rotation direction. In addition, the display device 100 may control the rotation of the display 110 based on the detected rotation angle of the display 110. For example, in case that the detected rotation angle of the display 110 is greater than a predetermined angle, the display device 100 may rotate the display 110 in the detected rotation direction.

For convenience of explanation, FIG. 5 shows that the guide message 51 is displayed in a state in which the display 110 is rotated from its vertical position. However, the guide message 51 may be displayed in a state in which the display 110 is rotated from its horizontal position.

Figure 6:
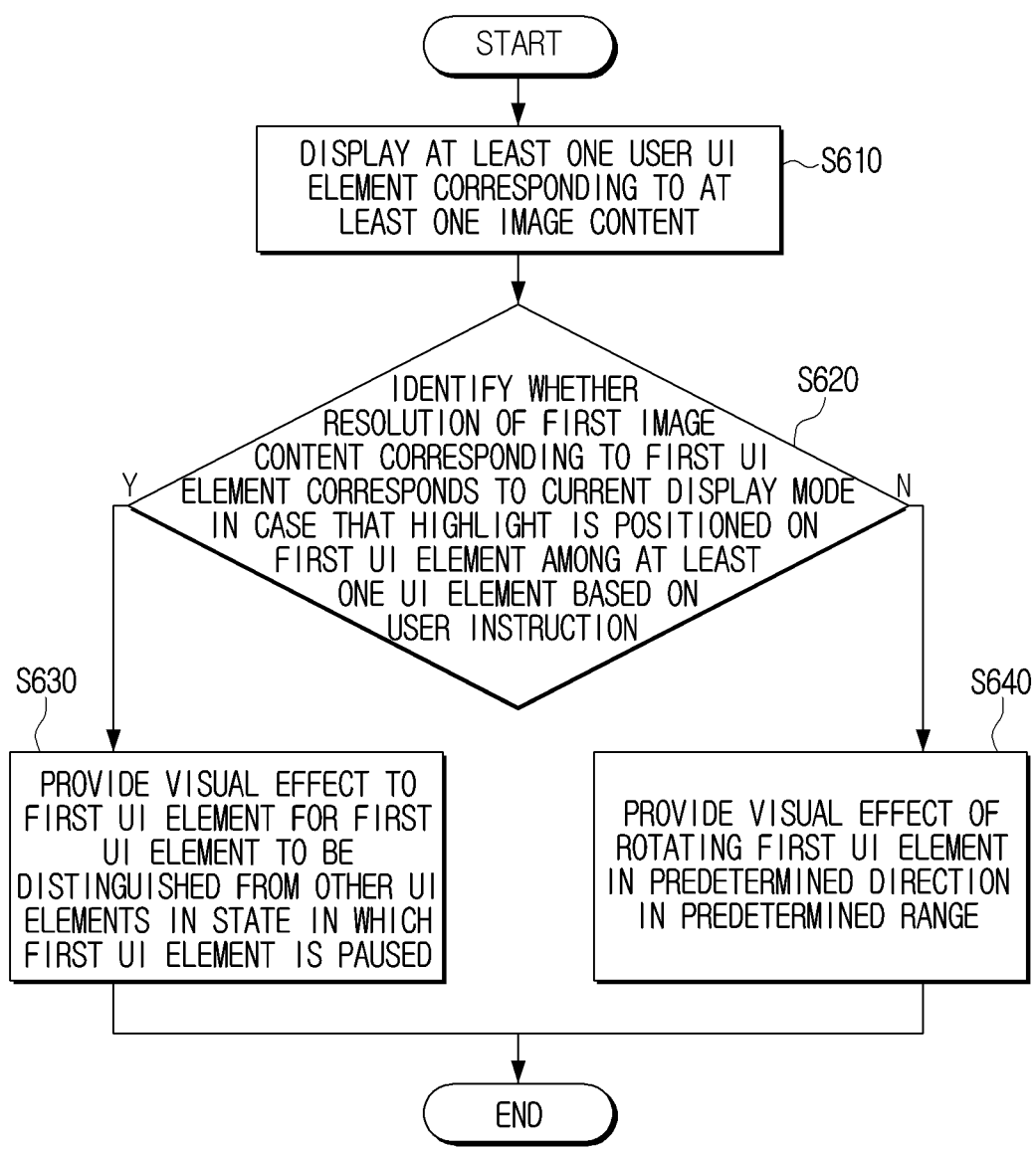
FIG. 6 is a flowchart showing a method for controlling a display device, according to an embodiment of the disclosure.

FIG. 6 is a flowchart showing a method for controlling a display device, according to an embodiment of the disclosure. In detail, FIG. 6 is a flowchart showing a method for controlling the display device 100 described with reference to FIG. 2A.

The display device 100 may display at least one user interface (UI) element corresponding to at least one image content (S610).

In addition, the display device 100 may identify whether a resolution of a first image content corresponding to a first UI element corresponds to a current display mode in case that a highlight is positioned on the first UI element among the at least one UI element based on a user instruction (S620). For example, the display device 100 in a vertical mode may identify that the first image content having a 16:9 aspect ratio does not correspond to the vertical mode that is the current display mode. To the contrary, the display device 100 in a horizontal mode may identify that the first image content having the 16:9 aspect ratio corresponds to the horizontal mode that is the current display mode.

In case that the resolution of the first image content corresponds to the current display mode, the display device 100 may provide the visual effect to the first UI element for the first UI element to be distinguished from the other UI elements while the first UI element is paused (S630). For example, the display device 100 may display a border of the first UI element in a first color for the first UI element to be distinguished from the other UI elements.

To the contrary, in case that the resolution of the first image content does not correspond to the current display mode, the display device 100 may provide the visual effect of rotating the first UI element in a predetermined direction in a predetermined range (S640). For example, the display device 100 may provide the visual effect of rotating the first UI element clockwise by 90 degrees and then counterclockwise by 90 degrees.

Figure 7:
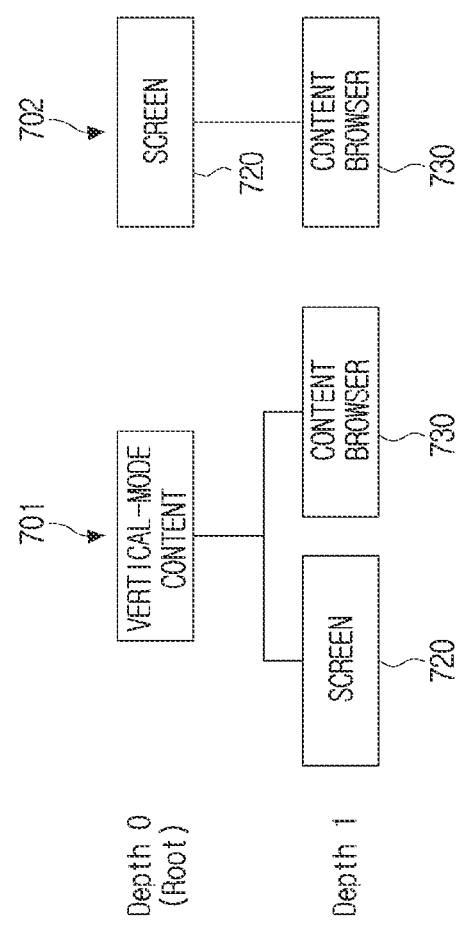
FIG. 7 is a block diagram showing a layout hierarchy of a display, according to an embodiment of the disclosure.

FIG. 7 is a block diagram showing a layout hierarchy of a display, according to an embodiment of the disclosure. Referring to FIG. 7, the display 110 may have a different layout hierarchy based on an operation mode of the display device 100. In detail, the display 110 may have a first hierarchy 701 in case that the display device 100 is in the vertical mode. In addition, the display 110 may have a second hierarchy 702 in case that the display device 100 is in the horizontal mode.

The first hierarchy 701 may include a vertical-mode content 710, a screen 720 and a content browser 730. Here, the vertical-mode content 710 may refer to a content provided only in case that the display device 100 is in the vertical mode. For example, the vertical-mode content 710 may include various applications such as a watch, a picture, a photo, etc. In addition, the screen 720 may refer to a region in which a content provided from an application or an external source (e.g., set-top box, digital versatile disk (DVD), USB (universal serial bus), etc.) is displayed. In addition, the content browser 730 may include information on the image content (e.g., a title of the image content, a thumbnail, etc.).

Here, the vertical-mode content 710 may have a depth value of zero (that is, the root), and the screen 720 and the content browser 730 may have a depth value of 1, respectively. Therefore, the display device 100 in the vertical mode may display the vertical-mode content 710 and then display the screen 720 and the content browser 730. In addition, the display device 100 in the vertical mode may selectively display the screen 720 or the content browser 730. The display device 100 in the vertical mode may not display the screen 720. A conventional display device (e.g., television (TV)) has a hierarchy in which the screen has the depth value of zero, and thus the screen always needs to be displayed in a state in which the display device is turned on. However, the display device 100 in the vertical mode according to the disclosure has the first hierarchy 701 in which the vertical-mode content 710 has the depth value of zero, and thus may selectively turn off the screen 720 in the state in which the display device is turned on.

The second hierarchy 702 may include the screen 720 and the content browser 730. Here, the screen 720 may have the depth value of zero (that is, the root), and the content browser 730 may have the depth value of 1. Accordingly, the display device 100 in the horizontal mode may display the screen 720 and then display the content browser 730. That is, the display device 100 in the horizontal mode may display the content browser 730 after displaying the screen 720 having the depth value of zero.

As such, the display device 100 may have a different layout hierarchy based on its operation mode.

Hereinafter, a display layout of the display device 100 according to embodiments is described with reference to the drawings.

Figure 8A:
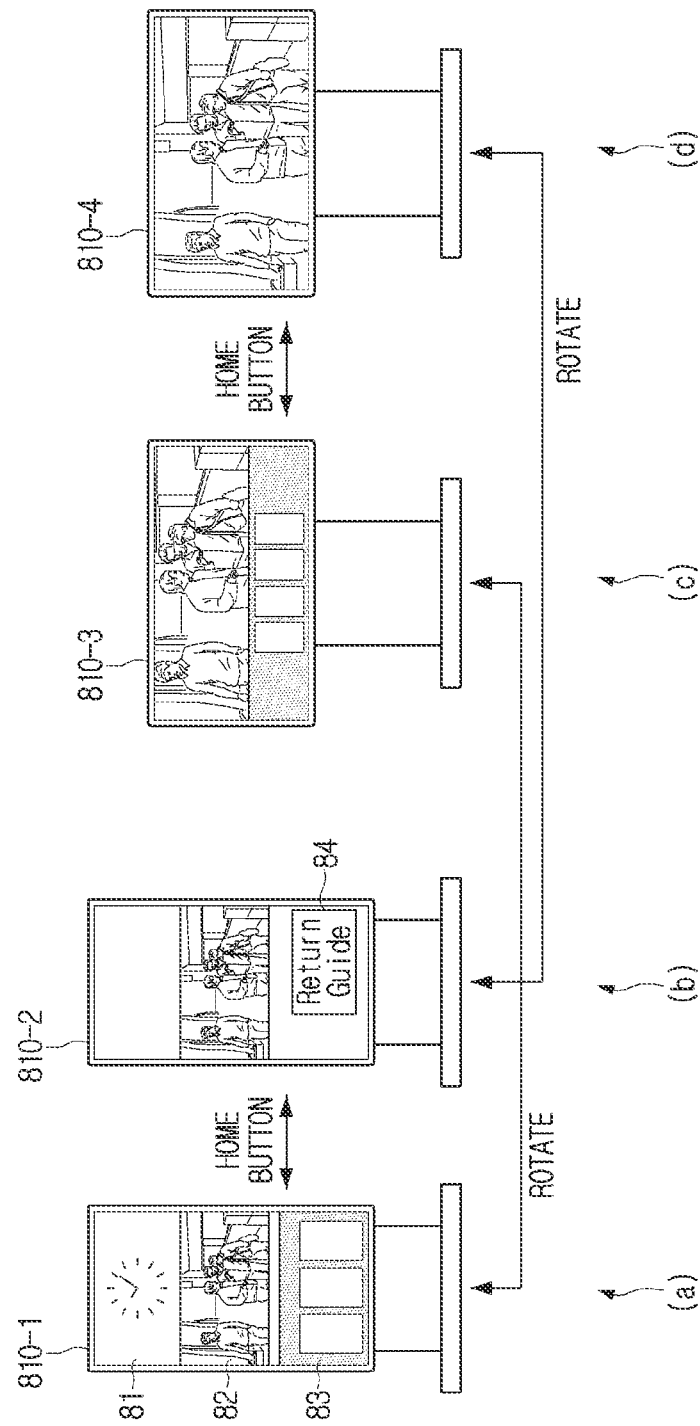
FIG. 8A is a view for describing a display layout of a display device, according to an embodiment of the disclosure.

FIG. 8A is a view for describing a display layout of a display device, according to an embodiment of the disclosure. In detail, FIG. 8A is a view showing the layout of the display 110 in which an image content is displayed at a resolution (e.g., 16:9) corresponding to the horizontal mode of the display device 100.

Referring to portions (a) and (b) of FIG. 8A, in case that the display device 100 is in the vertical mode, the display 110 may have a first layout 810-1 and a second layout 810-2. In addition, referring to portions (c) and (d) of FIG. 8A, in case that the display device 100 is in the horizontal mode, the display 110 may have a third layout 810-3 and a fourth layout 810-4. In detail, the first layout 810-1 may include a vertical-mode content 81, a screen 82 and a content browser 83. Here, the display device 100 may display the vertical-mode content 81 (e.g., a watch) and display the screen 82 and the content browser 83 on the vertical-mode content 81. In addition, the content browser 83 may be displayed in a region below the screen 82. In addition, the screen 82 and the content browser 83 may be displayed overlaid on each other on the vertical-mode content 81.

In case of obtaining a user instruction to input a predetermined button (e.g., home button) included in the user terminal 200 or the remote control device 300, the display device 100 displaying the first layout 810-1 may remove the vertical-mode content 81 and the content browser 83 and display a return guide 84. Here, the display 110 may have the second layout 810-2. Here, the second layout 810-2 may include the screen 82 and the return guide 84. Here, the display device 100 may display the return guide 84 for a predetermined time, and may not display the return guide 84 after the predetermined time passes by. Here, the return guide 84 may include a text guiding switching from the second layout 810-2 to the first layout 810-1.

In addition, in case of obtaining the user instruction to rotate the display 110, the display device 100 displaying the first layout 810-1 may display the screen 82 and the content browser 83 while rotating the display 110 in the horizontal direction. Here, the display 110 may have the third layout 810-3. Here, the third layout 810-3 may include the screen 82 and the content browser 83. In addition, the content browser 83 may be displayed overlaid on the screen 82. In case of obtaining the user instruction to rotate the display 110, the display device 100 displaying the third layout 810-3 may display the first layout 810-1 again while rotating the display 110 in the vertical direction.

In addition, in case of obtaining the user instruction to rotate the display 110, the display device 100 displaying the second layout 810-2 may remove the return guide 84, and enlarge and display the screen 82 while rotating the display 110 in the horizontal direction. Here, the display 110 may have the fourth layout 810-4. Here, the fourth layout 810-4 may include the screen 82. In case of obtaining the user instruction to rotate the display 110, the display device 100 displaying the fourth layout 810-4 may display the second layout 810-2 again while rotating the display 110 in the vertical direction. In addition, the display 110 may be switched from the fourth layout 810-4 to the third layout 810-3 based on the user instruction to input the predetermined button (e.g., home button) included in the user terminal 200 or the remote control device 300. Alternatively, the display 110 may be switched from the third layout 810-3 to the fourth layout 810-4 based on the user instruction.

The display layout may be changed based on the resolution of the image content.

Figure 8B:
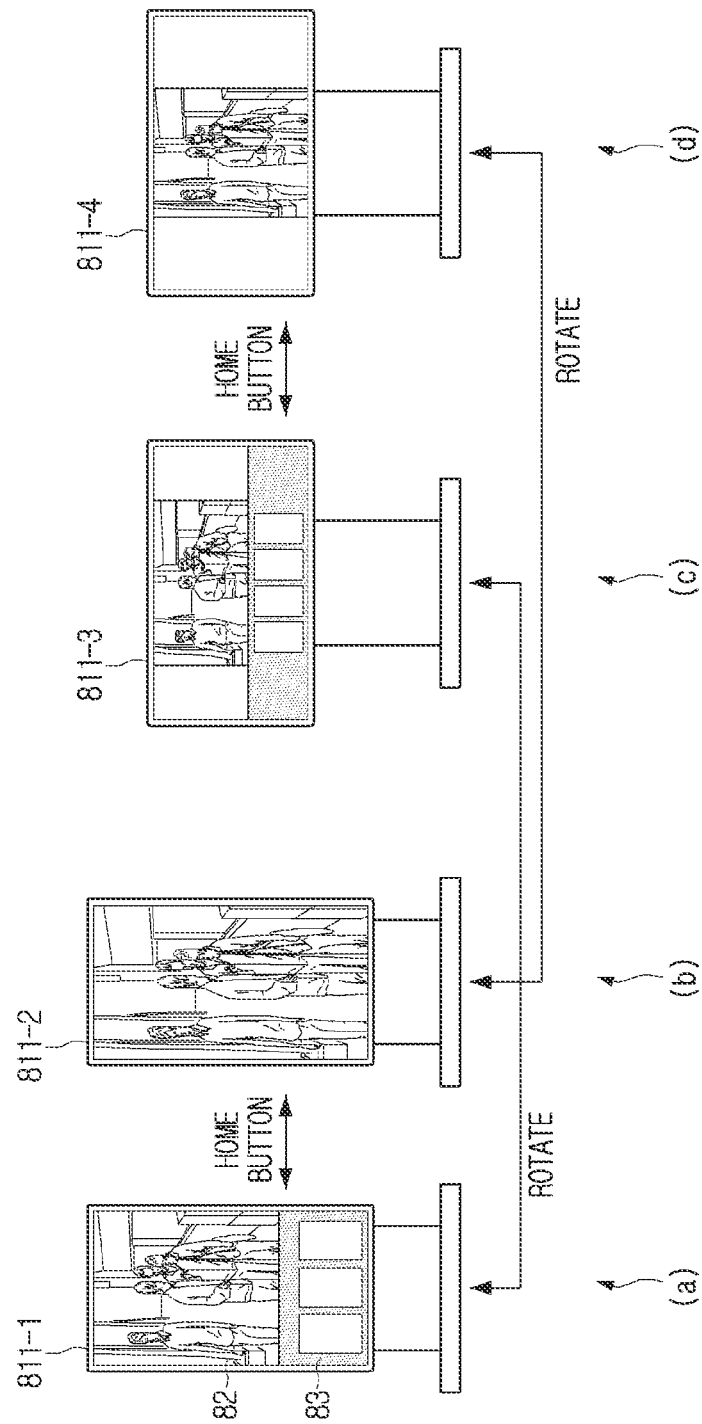
FIG. 8B is a view for describing a display layout of a display device, according to another embodiment of the disclosure.

FIG. 8B is a view for describing a display layout of a display device, according to another embodiment of the disclosure. In detail, FIG. 8B is a view showing the layout of the display 110 in which an image content is displayed at a resolution (e.g., 9:16) corresponding to the vertical mode of the display device 100.

Referring to portions (a) and (b) of FIG. 8B, in case that the display device 100 is in the vertical mode, the display 110 may have a fifth layout 811-1 and a sixth layout 811-2. In addition, referring to portions (c) and (d) of FIG. 8B, in case that the display device 100 is in the horizontal mode, the display 110 may have a seventh layout 811-3 and an eighth layout 811-4. In detail, the fifth layout 811-1 may include the screen 82 and the content browser 83. Here, the content browser 83 may be displayed overlaid on the screen 82 in a region below the region where the screen 82 is displayed.

In case of obtaining the user instruction to input the predetermined button (e.g., home button) included in the user terminal 200 or the remote control device 300, the display device 100 displaying the fifth layout 811-1 may remove the content browser 83. Here, the display 110 may have the sixth layout 811-2. Here, the sixth layout 811-2 may include the screen 82.

In addition, in case of obtaining the user instruction to rotate the display 110, the display device 100 displaying the fifth layout 811-1 may display the screen 82 while rotating the display 110 in the horizontal direction. Here, the display 110 may have the seventh layout 811-3. Here, the seventh layout 811-3 may include the screen 82 and the content browser 83. In addition, the content browser 83 may be displayed overlaid on the screen 82. In addition, as the display 110 is rotated in the horizontal direction, a size of the content browser 83 may be changed and displayed. For example, the display device 100 may enlarge and display the content browser 83 while rotating the display 110 in the horizontal direction. In addition, the number of the UI elements displayed on the content browser 83 may be increased. In addition, based on the resolution of the image content, there may be an empty region in which the image content is not displayed on each of both sides of the region in which the screen 82 is displayed. In addition, in case of obtaining the user instruction to rotate the display 110, the display device 100 displaying the seventh layout 811-3 may display the fifth layout 811-1 again while rotating the display 110 in the vertical direction.

In case of obtaining the user instruction to rotate the display 110, the display device 100 displaying the sixth layout 811-2 may rotate the display 110 in the horizontal direction. Here, the display 110 may have the eighth layout 811-4. In addition, the eighth layout 811-4 may include the screen 82. In addition, based on the resolution of the image content, there may be the empty region in which the image content is not displayed on each of the both sides of the region in which the screen 82 is displayed. In addition, in case of obtaining the user instruction to rotate the display 110, the display device 100 displaying the eighth layout 811-4 may display the sixth layout 811-2 again while rotating the display 110 in the vertical direction. In addition, the display 110 may be switched from the eighth layout 811-4 to the seventh layout 811-3 based on the user instruction to input the predetermined button (e.g., home button) included in the user terminal 200 or the remote control device 300. Alternatively, the display 110 may be switched from the seventh layout 811-3 to the eighth layout 811-4 based on the user instruction.

FIG. 8C is a view for describing a display layout of a display device, according to yet another embodiment of the disclosure. In detail, FIG. 8C is a view showing the layout of the display 110 in which an image content supported with a resolution corresponding to each of the vertical mode and horizontal mode of the display device 100 is displayed. Referring to portions (a) and (b) of FIG. 8C, in case that the display device 100 is in the vertical mode, the display 110 may have a ninth layout 812-1 and a tenth layout 812-2. Here, the display device 100 may display the image content at the resolution (e.g., 9:16) corresponding to the vertical mode. In addition, referring to portions (c) and (d) of FIG. 8C, in case that the display device 100 is in the horizontal mode, the display 110 may have an eleventh layout 812-3 and a twelfth layout 812-4. Here, the display device 100 may display the image content at the resolution (e.g., 9:16) corresponding to the horizontal mode. As such, the display device 100 may display the image content with a resolution changed based on the display mode. Accordingly, the display device 100 may display the image content with no empty region of the display 110 in both the vertical and horizontal modes.

The ninth layout 812-1 may correspond to the fifth layout 811-1. In addition, the tenth layout 812-2 may correspond to the sixth layout 811-2. In addition, the eleventh layout 812-3 may correspond to the third layout 810-3. In addition, the twelfth layout 812-4 may correspond to the fourth layout 810-4. Therefore, the description omits detailed descriptions of the ninth to twelfth layouts.

In addition, for convenience of explanation, FIGS. 8A, 8B and 8C illustrate an example in which the image content is displayed at the resolution of 9:16 or at the resolution of 16:9, and the resolution is not limited thereto. The display device 100 may be operated as described above even in case that the image content is displayed at various resolutions (for example, 1:1).

FIG. 8D is a view for describing a display layout of a display device, according to still another embodiment of the disclosure. In detail, FIG. 8D is a view for describing the display layout in which the display device 100 in a power-off state is powered on based on a user instruction.

Referring to portions (a) and (b) of FIG. 8D, in case of obtaining the user instruction to power on the display device 100, the display device 100 may display the vertical-mode content 81. Here, the display 110 may have a first-first layout 813-1. In addition, referring to portion (c) of FIG. 8D, in case of obtaining the user instruction to input the predetermined button (e.g., home button), the display device 100 may display the screen 82 and the content browser 83. In addition, the display device 100 may display the screen 82 and the content browser 83 on the vertical-mode content 81. Here, the display 110 may have a first-second layout 813-2. Here, the display device 100 may display on the screen 82, the last displayed content before the display device 100 is powered off. For example, the display device 100 may display on the screen 82, the image content provided from the last executed application or external source before the display device 100 is powered off.

The display device 100 may adjust brightness of the vertical-mode content 81 in case of displaying the screen 82 and the content browser 83. In detail, the display device 100 may reduce the brightness of the vertical-mode content 81 in case of displaying the screen 82 and the content browser 83. Accordingly, the display device 100 may improve user immersion in the image content provided on the screen 82.

Referring to portions (a) and (c) of FIG. 8D, in case of obtaining the user instruction to power on the display device 100, the display device 100 may switch the layout of the display 110 to the first-second layout 813-2, not the first-first layout 813-1. That is, the display device 100 may immediately switch the layout of the display 110 to the first-second layout 813-2 without the user instruction to input the predetermined button. The display device 100 may select the layout of the display 110 to be switched in response to the user's power-on instruction based on a type of the image content provided on the screen 82. For example, in case that the image content is an application, the display device 100 may switch the layout of the display 110 to the first-second layout 813-2 in response to the user's power-on instruction. In addition, in case that the image content is a content provided from the external source (e.g., set-top box, DVD, USB, etc.), the display device 100 may switch the layout of the display 110 to the first-first layout 813-1 in response to the user's power-on instruction.

In case that the display device 100 displays the image content provided from the external source, the display layout may be changed depending on whether an external source control function (e.g., HDMI consumer electronics control (CEC)) using an interface (e.g., high definition multimedia interface (HDMI)) connected to the display device 100 is included in the external source. For example, in case that the HDMI CEC function is included in the external source, the display device 100 and the external source may both be powered on in response to the user's power-on instruction, and the display 110 may have the layout as shown in FIG. 8D.

Figure 8E:
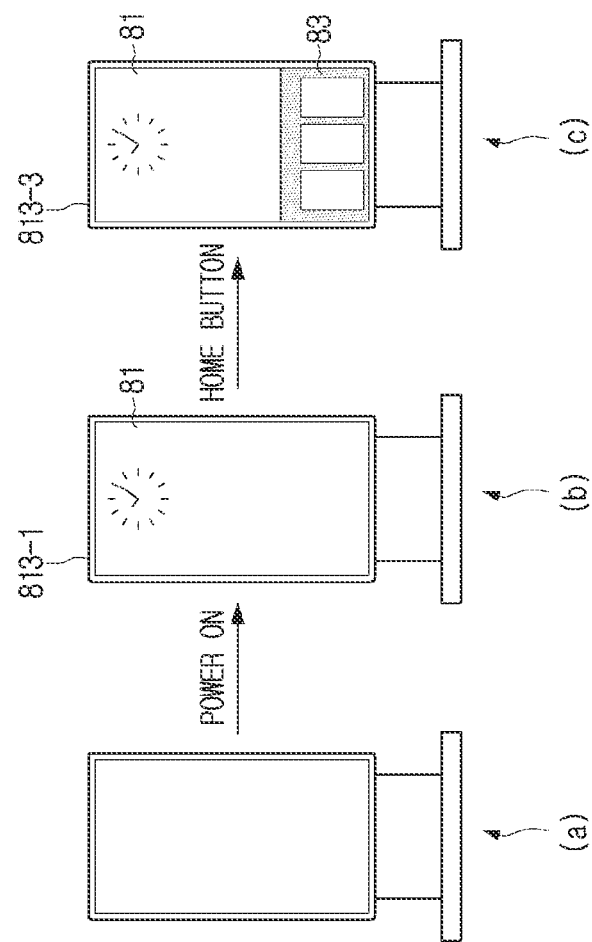
FIG. 8E is a view for describing a display layout of a display device, according to yet still another embodiment of the disclosure.

To the contrary, in case that the HDMI CEC function is not included in the external source, the display 110 may have a layout as shown in FIG. 8E.

FIG. 8E is a view for describing a display layout of a display device, according to yet still another embodiment of the disclosure.

Referring to portions (a) and (b) of FIG. 8E, the display device 100 may switch the layout of the display 110 to the first-first layout 813-1 in response to the user's power-on instruction. That is, the display device 100 may display the vertical-mode content 81. As the HDMI CEC function is not included in the external source, the external source may not be powered on even if the external source obtains the user instruction to power on the display device 100. Referring to portion (c) of FIG. 8E, the display device 100 may switch the layout of the display 110 to a first-third layout 813-3. In detail, the display device 100 may display the vertical-mode content 81 and the content browser 83. That is, the display device 100 may not display the screen 82.

In case that the external source is powered off or not connected to a conventional television (TV) device, the TV device may output a message (e.g., "no signal") indicating its connection state with the external source. To the contrary, the display device 100 according to the disclosure may provide the user with the content by displaying the vertical-mode content 81 even if the external source is powered off or not connected to the display device 100. Accordingly, the user satisfaction may be improved.

Figure 8F:
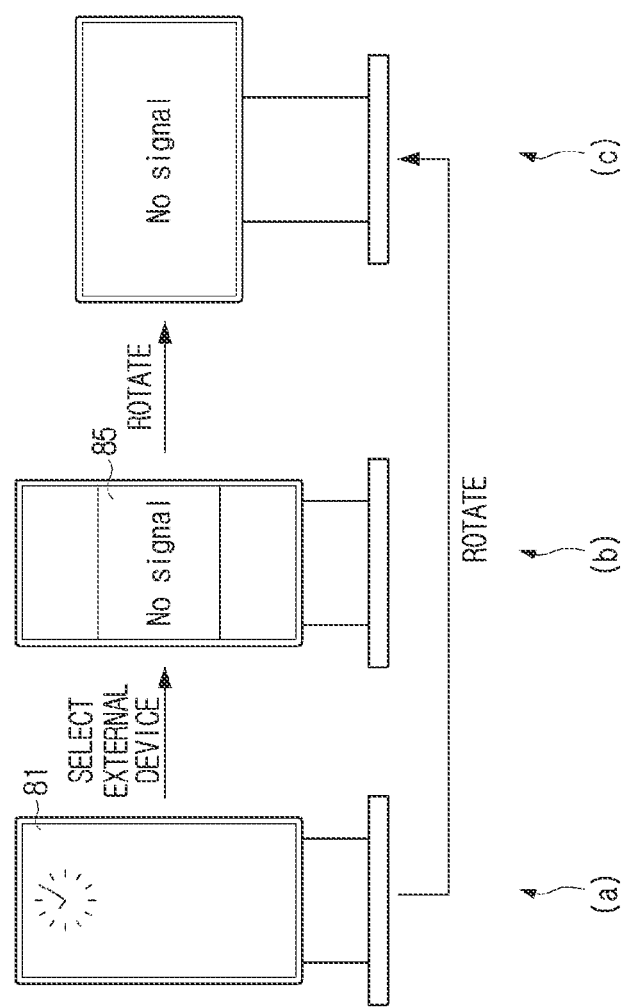
FIG. 8F is a view for describing a display layout of a display device, according to even yet still another embodiment of the disclosure.

FIG. 8F is a view for describing a display layout of a display device, according to even yet still another embodiment of the disclosure.

In detail, FIG. 8F is a view showing a display layout in which the display device 100 obtains a user instruction to select an external source that is in a power-off state.

Referring to portion (a) of FIG. 8F, the display device 100 may display the vertical-mode content 81. In addition, the display device 100 may obtain a user instruction to select a first external source among at least one external source connected to the display device 100. Here, the first external source may be in a power-off state. Referring to portion (b) of FIG. 8F, the display device 100 may display a state message 85 indicating the power state of the first external source. Here, the state message 85 may be displayed overlaid on the vertical-mode content 81. In addition, referring to portion (c) of FIG. 8F, in case of obtaining the user instruction to rotate the display 110, the display device 100 may display the state message 85 while rotating the display 110 in the horizontal direction. Here, based on the rotation of the display 110, the display device 100 may display the state message 85 at a changed size.

As described above, in case that the display device 100 obtains the user's power-on instruction in the power-off state, the display device 100 may display on the screen 82, the last displayed content before the display device 100 is powered off.

In addition, in case that the last displayed content before the display device 100 is powered off is a content provided from the external source, the display device 100 in the vertical mode may provide the user with the content by displaying the vertical-mode content 81 even if the external source is powered off. That is, here, the display device 100 may not output the state message 85 but output the vertical-mode content 81. If the external source is powered off, in case of obtaining the user instruction to rotate the display 110 in the horizontal direction, the display device 100 may display the state message 85 while rotating the display 110 in the horizontal direction. That is, as the display device 100 here enters the horizontal mode, the display device 100 is unable to output the vertical-mode content 81 and may thus output the state message 85.

The above description describes the embodiments of the display layout.

Hereinafter, the description focuses on a configuration of a display device according to an embodiment of the disclosure.

Figure 9:
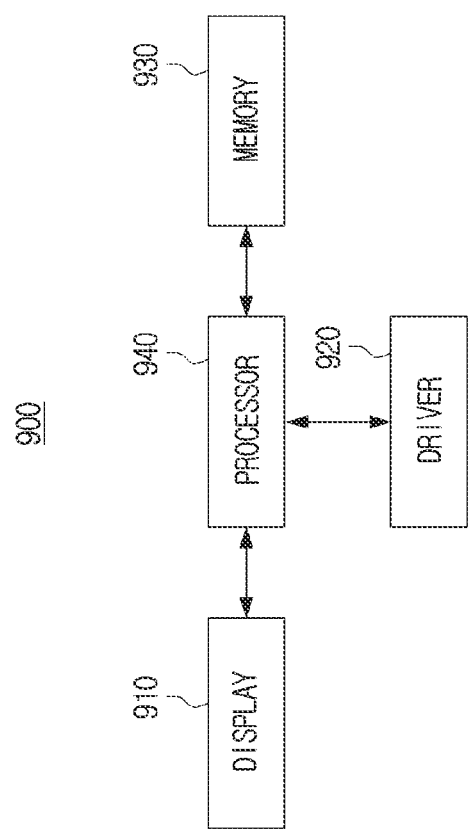
FIG. 9 is a block diagram showing a configuration of a display device according to an embodiment of the disclosure.

FIG. 9 is a block diagram showing a configuration of a display device according to an embodiment of the disclosure. Referring to FIG. 9, a display device 900 may include a display 910, a driver 920, a memory 930 and a processor 940.

The display 910 may output image data under control of the processor 940. In detail, the display 910 may output an image pre-stored in the memory 930 under the control of the processor 940. The display 910 may display a user interface (UI) stored in the memory 930.

The display 910 may be implemented as a liquid crystal display (LCD) or organic light emitting diodes (OLED) panel, and may be implemented as a flexible display, a transparent display or the like. However, the display 910 according to the disclosure is not limited to a type.

The driver 920 may rotate the display 910. In detail, the driver 920 may be connected to the display 910, and may be driven under the control of the processor 940 to rotate the display 910 connected to the driver 920 in a clockwise or counter-clockwise direction. Accordingly, the display 910 may be rotated in the horizontal or vertical direction. The driver 920 may be implemented as various motors such as a direct current electric motor (DC motor), an alternating current electric motor (AC motor), a brushless DC (BLDC) electric motor, etc.

The memory 930 may store at least one instruction regarding the display device 900. In addition, the memory 930 may store an operating system (O/S) for driving the display device 900. In addition, the memory 930 may store various software programs or applications for operating the display device 900 according to embodiments of the disclosure. In addition, the memory 930 may include a semiconductor memory such as a flash memory, or a magnetic storing medium such as a hard disk.

In detail, the memory 930 may store various software modules for operating the display device 900 according to embodiments of the disclosure, and the processor 940 may execute the various software modules stored in the memory 930 to control an operation of the display device 900. That is, the memory 930 is accessed by the processor 940, and readout, recording, correction, deletion, update and the like of data in the memory 930 may be performed by the processor 940.

The disclosure uses the term 'memory 930' to include the memory 930, a read only memory (ROM) in the processor 940, a random access memory (RAM) or a memory card (for example, a micro secure digital (SD) card or a memory stick) mounted in the display device 900.

In the embodiments according to the disclosure, the memory 930 may store information on a rotation direction of the display 910 corresponding to a type of a content displayed based on a user instruction. In addition, the memory 930 may store a content received from an external device such as the user terminal 200 or a broadcast reception device. In addition, the memory 930 may store various information, and the information stored in the memory 930 may be updated as being received from a server or the external device or input by a user.

The processor 940 may control an overall operation of the display device 900. In detail, the processor 940 may be connected to the components of the display device 900 such as the display 910, the driver 920 and the memory 930, as described above, and may control the overall operation of the display device 900 by executing at least one instruction stored in the memory 930 as described above.

The processor 940 may be implemented in various schemes. For example, the processor 940 may be implemented as any one or any combination of an application specific integrated circuit (ASIC), an embedded processor, a microprocessor, a hardware control logic, a hardware finite state machine (FSM) and a digital signal processor (DSP). The disclosure uses the term 'processor 940' to include a central processing unit (CPU), a graphic processing unit (GPU), and a main processing unit (MPU), etc.

In the embodiments according to the disclosure, the processor 940 may control the display 910 to be rotated and display the content. Hereinafter, the description focuses on the embodiments of the disclosure under the control of the processor 940.

The processor 940 may control at least one UI element corresponding to at least one image content to be displayed.

In addition, the processor 940 may identify whether a resolution of a first image content corresponding to a first UI element corresponds to a current display mode in case that a highlight is positioned on the first UI element among the at least one UI element based on a user instruction.

In case that the resolution of the first image content is identified not to correspond to the current display mode, the processor 940 may provide a visual effect of rotating the first UI element in a predetermined direction in a predetermined range. Here, the predetermined range may correspond to a rotation range of the display, and the predetermined direction may be the same as a rotation direction of the display. In addition, the processor 940 may control a text guiding the rotation direction of the display to be displayed around the first UI element while the current display mode is switched to a different mode from the current display mode.

In case that the resolution of the first image content corresponds to the current display mode, the processor 940 may provide the visual effect to the first UI element for the first UI element to be distinguished from another UI element rather than the first UI element among the at least one UI element while the first UI element is paused. For example, the processor 940 may control the first UI element to be displayed at an enlarged size or with increased brightness.

The processor 940 may control the first UI element to be displayed at a size changed to have the same aspect ratio as the first image content. For example, in case that the first image content has a resolution of 16:9, the processor 940 may control the first UI element to be displayed at a size changed to have the same aspect ratio of 16:9.

In addition, the processor 940 may control a guide message on rotation of the display 910 to be displayed while rotating the display 910 in the predetermined direction in case of obtaining a user instruction to select the first UI element. Here, the processor 940 may move pixel coordinates of the guide message based on a rotation angle of the display 910 for the guide message to be displayed while maintaining its horizontality with an installation surface of the display device 900 during the rotation of the display 910. Accordingly, even though the display 910 is rotated, the guide message may be displayed while maintaining its horizontality with the installation surface of the display device 900.

In addition, the guide message may include information on the rotation direction of the display 910 and cancellation of the rotation of the display 910 based on switching of the display mode of the display device 900. For example, the guide message may include a text such as "If you want to cancel the rotation, please press the rotation button." In addition, in case of obtaining a user instruction to cancel the rotation of the display 910 during the rotation of the display 910, the processor 940 may control the display to be rotated in a direction opposite to the predetermined rotation direction to return the display 910 to its position before the rotation.

The embodiments of the disclosure described above may be implemented in a computer or a computer readable recording medium using software, hardware, or a combination of software and hardware. In some cases, the embodiments described in the disclosure may be implemented by the processor itself. According to a software implementation, embodiments such as procedures and functions described in the disclosure may be implemented by separate software modules. Each of the software modules may perform one or more functions and operations described in the disclosure.

Computer instructions for performing processing operations according to the embodiment of the disclosure described above may be stored in a non-transitory computer-readable medium. The computer instructions stored in the non-transitory computer-readable medium allow a machine to perform the processing operations according to the embodiments described above in case that they are executed by a processor of the machine.

The non-transitory computer-readable medium is not a medium that stores data for a while, such as a register, a cache or a memory, but may refer to a medium that semi-permanently stores data and is readable by a machine. An example of the non-transitory computer-readable medium may include a compact disk (CD), a digital versatile disk (DVD), a hard disk, a blu-ray disk, a universal serial bus (USB), a memory card, a read only memory (ROM) or the like.

The machine-readable storage medium may be provided in a form of a non-transitory storage medium. Here, the 'non-transitory storage medium' is a tangible device and may only indicate that the device does not include a signal (e.g., electromagnetic wave). This term does not distinguish whether data are semi-permanently or temporarily stored in the storage medium. For example, the 'non-transitory storage medium' may include a buffer in which data is temporarily stored.

According to an embodiment, the methods according to the embodiments disclosed in the disclosure may be included and provided in a computer program product. The computer program product may be traded as a product between a seller and a purchaser. The computer program product may be distributed in a form of the machine-readable storage medium (for example, a compact disc read only memory (CD-ROM)) that may be read by the machine, or distributed online (e.g. download or upload) through an application store (for example, PlayStore™) or directly between two user devices (e.g., smartphones). In the case of the online distribution, at least portions of the computer program products may be at least temporarily stored or provided in the machine-readable storage medium such as a memory of a server of a manufacturer, a server of an application store or a relay server.

Although the embodiments of the disclosure are illustrated and described hereinabove, the disclosure is not limited to the above-mentioned embodiments, but may be variously modified by those skilled in the art to which the disclosure pertains without departing from the scope and spirit of the disclosure as disclosed in the accompanying claims. These modifications also may be understood to fall within the scope of the disclosure.

What is claimed is:

1. A method of controlling a display device outputting an image in either one of display modes comprising a horizontal mode and a vertical mode, the display device comprising a display configured to be rotatable, and the method comprising:

displaying at least one user interface (UI) element corresponding to at least one image content;

based on a user instruction of positioning a highlight on a first UI element among the displayed at least one UI element, identifying whether a resolution of a first image content corresponding to the first UI element corresponds to a current display mode; and based on the resolution of the first image content being identified to not correspond to the current display mode, providing a visual effect comprising at least one of displaying an indicator guiding a rotation direction of the display around the first UI element or rotating the first UI element in a predetermined direction in a predetermined range based on the resolution of the first image content being identified to not correspond to the current display mode, wherein the predetermined range corresponds to a rotation range of the display, and wherein the predetermined direction is the same as the rotation direction of the display.

2. The method of claim 1, wherein the providing of the visual effect comprises, displaying the first UI element at a size that is changed to have the same aspect ratio as the first image content.

3. The method of claim 1, wherein the providing of the visual effect comprises, based on the resolution of the first image content being identified to correspond to the current display mode, providing the visual effect to the first UI element so that the first UI element is distinguished from another UI element among the at least one UI element, while the first UI element is paused.

4. The method of claim 1, further comprising, based on a user instruction of selecting the first UI element among the displayed at least one UI element:

displaying a guide message on rotation of the display, while rotating the display in the predetermined direction; and moving pixel coordinates of the displayed guide message, based on a rotation angle of the display, so that a horizontality of the guide message is maintained with an installation surface of the display device during the rotation of the display.

5. The method of claim 4, wherein the guide message comprises information of the rotation direction of the display and of cancellation of the rotation of the display based on switching of the current display mode of the display device.

6. The method of claim 4, further comprising, based on a user instruction of canceling the rotation of the display during the rotation of the display, rotating the display in a direction opposite to the predetermined direction so that the display returns to a position before the rotation of the display.

7. A display device for outputting an image in either one of display modes comprising a horizontal mode and a vertical mode, the display device comprising:

a display configured to be rotatable; and a processor configured to:

control the display to display at least one user interface (UI) element corresponding to at least one image content;

based on a user instruction of positioning a highlight on a first UI element among the displayed at least one UI element, identify whether a resolution of a first image content corresponding to the first UI element corresponds to a current display mode; and based on the resolution of the first image content being identified to not correspond to the current display mode, control the display to provide a visual effect comprising at least one of displaying an indicator guiding a rotation direction of the display around the first UI element or rotating the first UI element in a predetermined direction in a predetermined range based on the resolution of the first image content being identified to not correspond to the current display mode;

wherein the predetermined range corresponds to a rotation range of the display, and wherein the predetermined direction is the same as the rotation direction of the display.

8. The display device of claim 7, wherein the processor is further configured to control the display to display the first UI element at a size that is changed to have the same aspect ratio as the first image content.

9. The display device of claim 7, wherein the processor is further configured to, based on the resolution of the first image content being identified to correspond to the current display mode, control the display to provide the visual effect to the first UI element so that the first UI element is distinguished from another UI element among the at least one UI element, while the first UI element is paused.

10. The display device of claim 7, wherein the processor is further configured to, based on a user instruction of selecting the first UI element among the displayed at least one UI element:

control the display to display a guide message on rotation of the display, while controlling to rotate the display in the predetermined direction; and control the display to move pixel coordinates of the displayed guide message, based on a rotation angle of the display, so that a horizontality of the guide message is maintained with an installation surface of the display device during the rotation of the display.

11. The display device of claim 10, wherein the guide message comprises information of the rotation direction of the display and of cancellation of the rotation of the display based on switching of the current display mode of the display device.

12. The display device of claim 10, wherein the processor is further configured to, based on a user instruction of canceling the rotation of the display during the rotation of the display, control the display to rotate the display in a direction opposite to the predetermined direction so that the display returns to a position before the rotation of the display.

13. A method of controlling a display device outputting an image in either one of display modes comprising a horizontal mode and a vertical mode, the display device comprising a display configured to be rotatable, and the method comprising:

displaying an image content;

based on a user instruction of rotating the display while the image content is displayed, controlling to rotate the display, and changing the image content, based on a rotation angle of the display;

based on a user instruction of calling a selection window during rotation of the display and while the changed image content is displayed, ceasing the rotation of the display, and displaying the selection window, while the changed image content is displayed; and based on a user selection of an item for adjusting a horizontality of the image content, among the displayed selection window, adjusting the horizontality of the image, based on the rotation angle of the display.

14. The method of claim 13, further comprising, based on the user instruction of calling the selection window while the image content is displayed, displaying the selection window, while the image content is displayed, the selection window comprising a guide message for guiding setting of the rotation angle of the display.

* * * * *